(12) United States Patent
Gagnon

(10) Patent No.: US 11,559,160 B2
(45) Date of Patent: *Jan. 24, 2023

(54) AUTOMATED IMMERSION APPARATUS AND METHOD FOR COOKING MEALS

(71) Applicant: Marc Gagnon, Montreal (CA)

(72) Inventor: Marc Gagnon, Montreal (CA)

(73) Assignee: Marc Gagnon, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,591

(22) Filed: Jan. 17, 2020

(65) Prior Publication Data

US 2020/0146499 A1 May 14, 2020

Related U.S. Application Data

(63) Continuation of application No. 14/432,176, filed as application No. PCT/CA2014/000202 on Mar. 10, 2014, now Pat. No. 10,537,198.

(60) Provisional application No. 61/911,837, filed on Dec. 4, 2013, provisional application No. 61/844,594, filed on Jul. 10, 2013, provisional application No. 61/774,774, filed on Mar. 8, 2013.

(51) Int. Cl.
*A47J 27/10* (2006.01)
*A23L 5/10* (2016.01)
*A23L 3/015* (2006.01)
*A23L 3/10* (2006.01)

(52) U.S. Cl.
CPC ............. *A47J 27/10* (2013.01); *A23L 3/0155* (2013.01); *A23L 3/10* (2013.01); *A23L 5/13* (2016.08); *A23V 2002/00* (2013.01)

(58) Field of Classification Search
CPC .......... A47J 27/10; A23L 5/13; A23L 3/0155; A23L 3/10; A23V 2002/00
See application file for complete search history.

(56) References Cited

U.S. PATENT DOCUMENTS

| | | | | |
|---|---|---|---|---|
| 5,281,426 A | * | 1/1994 | Pardo ........................ | A23L 3/10 426/232 |
| 2004/0060456 A1 | * | 4/2004 | Chung ................ | A47J 37/1295 99/407 |
| 2009/0022858 A1 | * | 1/2009 | Pawlick ................ | B65D 81/34 426/113 |
| 2014/0260998 A1 | * | 9/2014 | Pearson ................ | A47J 27/002 99/288 |

* cited by examiner

*Primary Examiner* — Steven N Leff
(74) *Attorney, Agent, or Firm* — Brouillette Legal Inc.; Robert Brouillette

(57) ABSTRACT

A system and method for storing, preserving and cooking meals using the sous-vide technique. The system and method of the present invention is designed to automatically cook, upon request a meal having various ingredients by immersing bagged food in temperature-controlled liquid. The cooking time may be manually or automatically programmed from downloaded cooking direction associated with the food. The cooking request may be given by a user from the physical apparatus or using a mobile device application.

19 Claims, 23 Drawing Sheets

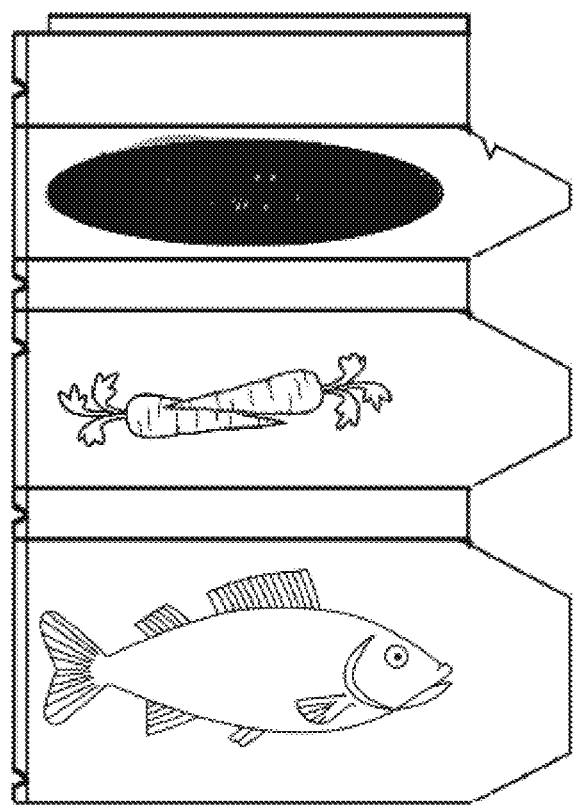
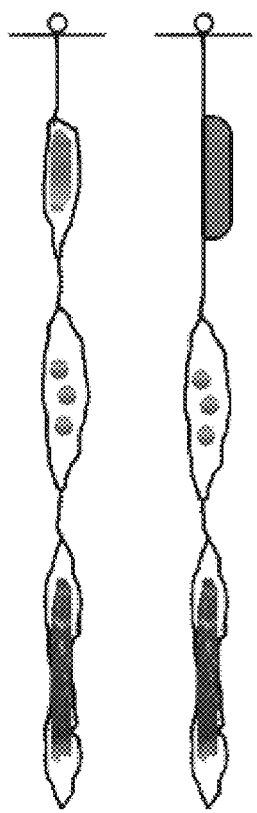
Figure 20a                Figure 20b  Figure 20c

AUTOMATED IMMERSION APPARATUS AND METHOD FOR COOKING MEALS

CROSS-REFERENCE TO RELATED APPLICATIONS

The present patent application is a divisional application of US national phase application U.S. Ser. No. 14/432,176 entitled "Automated Immersion Apparatus and Method for Cooking Meals" and filed on Mar. 27, 2015 at the United States Patent and Trademark Office as U.S. National Stage under 35 USC 371 of PCT application no. PCT/CA2014/000202 entitled "Automated Immersion Apparatus and Method for Cooking Meals" having a filing date of Mar. 10, 2014 which claims the benefits of priority of U.S. Provisional Patent Application No. 61/774,774, entitled "Automated Immersion System and Method for Cooking Meal" and filed at the United States Patent and Trademark Office on Mar. 8, 2013, of the U.S. Provisional Patent Application No. 61/844,594, entitled "Automated Immersion System and Method for Cooking Meal" and filed at the United States Patent and Trademark Office on Jul. 10, 2013 and of the U.S. Provisional Patent Application No. 61/911,837, entitled "Bag for cooking food" and filed at the United States Patent and Trademark Office on Dec. 4, 2013, which are herein incorporated by reference to the present patent application.

FIELD OF THE INVENTION

The present invention generally relates to manual and automated food cooking apparatus, systems and methods and more specifically to a system and method for cooking-cooling packaged food housed inside an appliance adapted to immerse food into a hot liquid during specific durations in order to cook a meal or different ingredients.

BACKGROUND OF THE INVENTION

In the 21$^{st}$ century, life is going at an unstoppable pace, efficiency and time optimization has begun to take center stage in people's life. In such a society, it is especially hard for families with multiple kids to find the time to complete all the required tasks. Consequently, many consume ready-to-eat meals. It is thus hard for working families having to feed or prepare meals for their kids without having the proper time to cook. Basically, when time is missing, they end up in restaurants or worse, in fast food chains. If they persevere enough to find the adequate time for cooking, and still feel like cooking, they end up working hard to produce the same meal for the whole family and spending precious time cleaning the kitchen afterward.

Sous-vide cooking has been around for some time, and several appliances are available for such cooking techniques. Sous-vide cooking principles are simple—food contained in a bag is introduced in hot liquid for cooking. As simple as the technique may look, manually executing sous-vide cooking and obtaining a desirable level of cooking is a complex task. The temperature of the liquid, such as water, must be precise and constant. Hot liquid must constantly circulate around the bag in order to keep a constant "energy transfer" from the liquid to the food during the cooking period. The cooking time is also an important issue that should not be overlooked.

Appliances to handle liquid temperature and circulation (e.g. Thermo Circulator) are known in the art. Typically, such appliances use a container to keep hot liquid and an alarm clock to calculate the duration. However, they cook the entire food pouch at the same time without distinction on its various components, giving rise to cooking conditions being far from optimal.

No single appliance is known to cook different parts of a meal (i.e. steak, potato, vegetables, etc.) during different time periods resulting in the optimal cooking duration for each part of a single meal. For multiple meals, none of the known appliances are designed, or even capable of cooking different meals at different times to feed a group of people, neither do they synchronize all the process to produce all the meals at the same ending time to serve every guest at the same moment. Additionally, none of them has the ability to preserve a meal and start the cooking process at a precise moment on demand.

There is thus a need for an integrated apparatus containing a preservation zone, an immersion zone for cooking and a zone for keeping food ready to be served, ideally at a precise moment. Similarly, there is a need for a method to keep food at the right temperature for preservation, to immerse the food in hot liquid, such as water, to end up with a meal or all parts of a meal ready to be served at a predetermined time.

SUMMARY OF THE INVENTION

The present invention will attempt to overcome the shortcomings of previous immersion cooking apparatuses and systems known while providing a method for such, preferably automated cooking.

The present invention contributes to achieve the previous and other objectives by means of a system for cooking-cooling food. The present invention will provide an apparatus designed for substantially preparing a meal. The, preferably automated apparatus may be integrated into a unitary apparatus or appliance for convenience of use. The present invention will typically cook a meal using immersion cooking by immersing the food in a temperature-controlled liquid.

One of the aspects of the present invention is to provide an automated immersion cooking method using at least one bag for cooking food comprising one or more individual sections, wherein the method comprises the steps to immerse one or more non-immersed sections of the at least one bag in liquid at a predetermined time according to predetermined cooking instructions, wherein the temperature of the liquid is maintained at a temperature for cooking food, to leave the one or more immersed sections of the at least one bag in the liquid for a specific duration according to the predetermined cooking instructions associated to the at least one bag and to retract the one or more immersed sections of the at least one bag from the temperature controlled liquid at a predetermined time according to the predetermined cooking instructions.

Another aspect of the present invention is to provide an automated immersion cooking method further comprising the step to maintain the at least one bag at a temperature allowing the preservation of the food.

Another aspect of the present invention is to provide an automated immersion cooking method further comprising the step to maintain the at least one bag retracted from the liquid at a temperature maintaining the food at a warm temperature.

Another aspect of the present invention is to provide an automated immersion cooking method using at least one bag for cooking food comprising one or more individual sections, wherein the method comprises the steps to attach the at least one bag over a container containing liquid maintained at a temperature for cooking food, to lower the at least one bag to a predetermined height and at a predetermined time according to the predetermined cooking instruction to immerse at least one non-immersed section of the bag within the container, to leave the at least one immersed section within the liquid for a predetermined duration and to raise the at least one lowered bag to a predetermined height and at a predetermined time within the container.

Another aspect of the present invention is to provide an automated immersion cooking method as described above further comprising the steps to maintain the at least one bag at a temperature allowing the preservation of the food and to maintain the at least one bag at a warm temperature suitable to be eaten.

Another aspect of the present invention is to provide an apparatus for automatically cooking food by immersion comprising a container configured for receiving liquid at a temperature allowing the cooking of the food, at least one compartment configured to receive at least one bag containing food. In such an apparatus, for each compartment comprised in the apparatus, the apparatus comprises at least one mechanism for moving the at least one bag in an out of the liquid of the container and at least one bag holder attached to the mechanism.

A further aspect of the present invention is to provide the apparatus as described wherein the at least one mechanism for moving the bag in and out of the liquid is powered by a motor, which motor is controlled by a motor controller typically connected to a controller unit.

Another aspect of the present invention is to provide an automated immersion cooking method using at least one bag for cooking food comprising one or more individual sections, wherein the method comprises the steps to attach at least one bag in at least one compartment, wherein the at least one sections contains food, to fill the at least one compartment of a liquid at predetermined level, wherein the liquid is maintained at a temperature to allow cooking of the food and to drain a predetermined volume of a liquid contained in the at least one compartment at a predetermined time. The method may further comprise a step to maintain the temperature of the at least one compartment at a temperature to preserve the food and to maintain the at least one compartment at a warm temperature suitable to be keep the at least one bag at a temperature suitable to eat the contained food.

Another aspect of the present invention is to provide an apparatus for automatically cooking food by immersion comprising at least one impervious compartment shaped to receive at least one bag for cooking food. Each compartment comprises a mechanism to fill liquid in the compartment, a mechanism to drain liquid from the compartment and a liquid circulation system. Furthermore, the mechanism to fill liquid may comprise at least one fluid inlet valve and may comprise at least one fluid outlet valve.

Another aspect of the present invention is to provide a bag for immersion cooking comprising at least one impervious section, wherein the at least one impervious section comprises at least one hanging system and at least one pocket adapted to receive food. The bag may further comprise a plurality of sections and wherein each pair of sections is separated by at least one gap. Each gap may comprise a notch helping a user to tear apart the different sections of the bag.

According to one aspect of the present invention, an automated immersion cooking method using at least one bag for cooking food comprising one or more individual sections is disclosed. The method typically comprises the steps to attach at least one bag in at least one compartment, wherein the at least one sections contains food, fill the at least one compartment of a liquid at predetermined level, wherein the liquid is maintained at a temperature to allow cooking of the food, leave the at least one bag within the liquid for a predetermined duration and drain a predetermined volume of a liquid contained in the at least one compartment at a predetermined time.

According to one aspect of the present invention, an apparatus for automatically cooking food by immersion is disclosed. The apparatus typically comprises at least one impervious compartment shaped to receive at least one bag for cooking food, wherein each compartment comprises a mechanism to fill liquid in the compartment, a mechanism to drain liquid from the compartment and a liquid circulation system.

The features of the present invention which are believed to be novel are set forth with particularity in the appended claims.

BRIEF DESCRIPTION OF THE DRAWINGS

FIGS. 20a, 20b and 20c show front and side views of a bag in accordance with the principles of the present invention.

DETAILED DESCRIPTION OF THE PREFERRED EMBODIMENT

The present meal cooking system and method is designed to prepare one or more meals using immersion cooking techniques. According to the principles of the present invention, the present food cooking system and method provides an automated solution for preparing a cooked meal. As such, the immersion cooking process is preferably automated.

Figure 1:
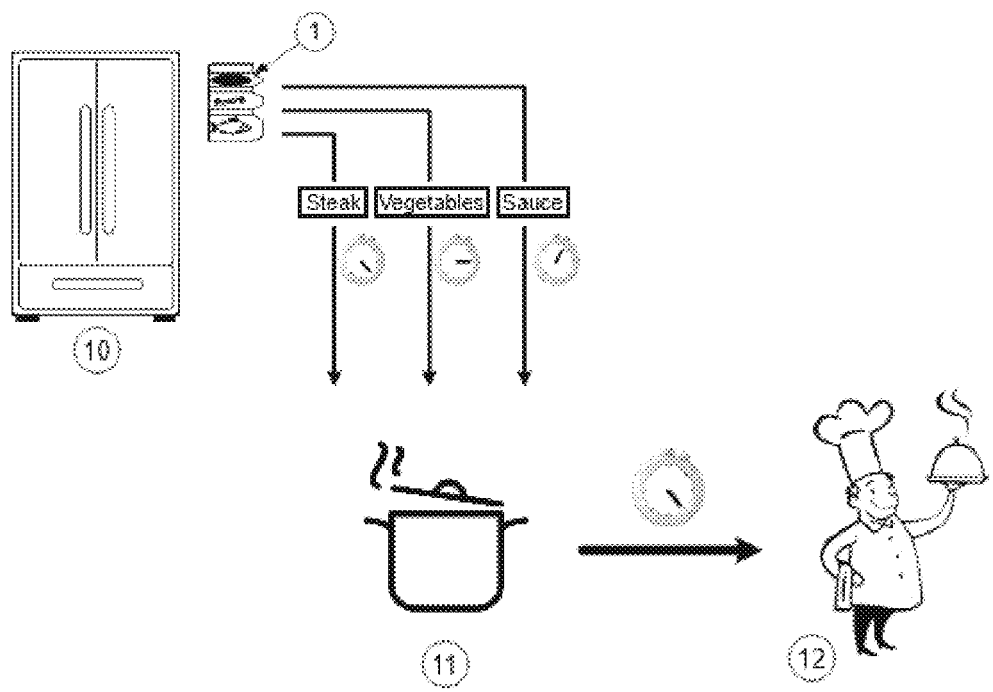
FIG. 1 depicts the complete process for preparing a meal comprising different aliments or ingredients.

Now referring to FIG. 1, preparing a meal using conventional immersion cooking techniques requires time, knowledge and skills. The typical process to cook a meal or food using immersion or sous-vide requires steps such as taking the food from storage 10, typically from the refrigerator 10 or from the freezer and place various components 1, meat, vegetable, side, etc. in the immersion cooking apparatus 11. The different meal elements 1 almost always have different cooking duration and instructions. Some should be unfrozen before cooking while other may taste better if cooked directly from the freezer. As such, the cook must carefully read the instructions for each meal element 1 and monitor the cooking time. Once the cooking time for an element has lapsed, the cook typically removes this element while some other elements still cook. One advantage of immersion cooking is the amount of heat from the immersion of the food generally provide for fast cooking. However, such cooking also requires constant monitoring because an over-cooked or undercooked meal may be a matter of seconds. One must understand the level of complexity of having every element ready for serving 12 at the same time for a single meal.

Figure 2:
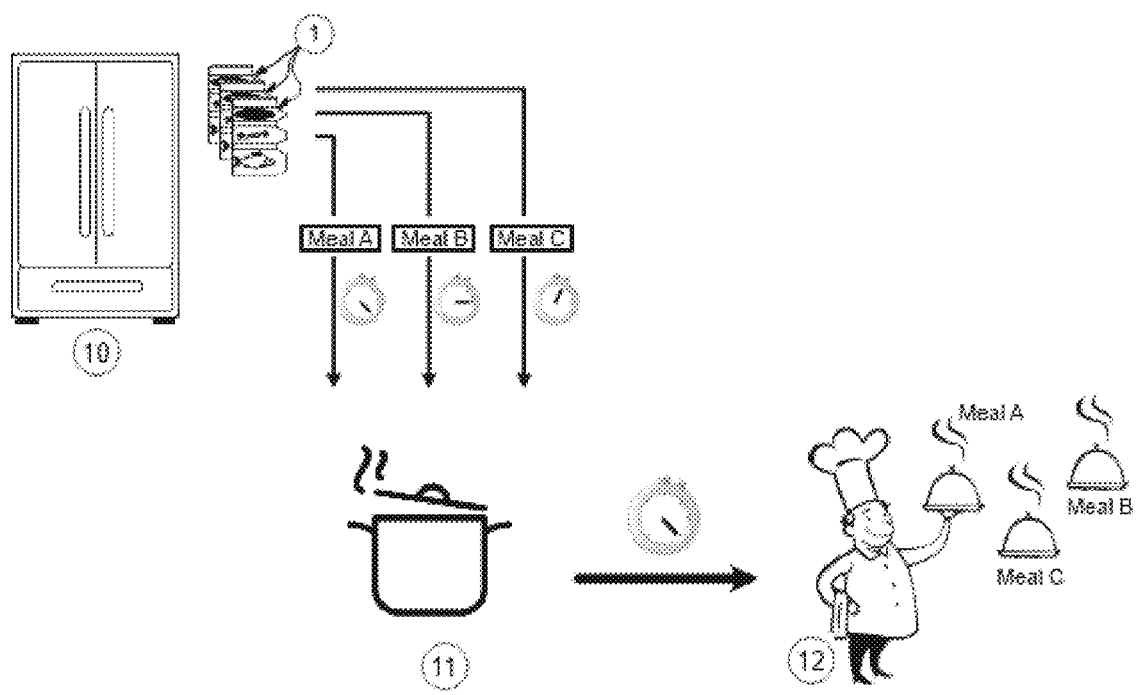
FIG. 2 depicts the complete process for preparing a plurality of meals comprising different aliments or ingredients.
Figure 3:
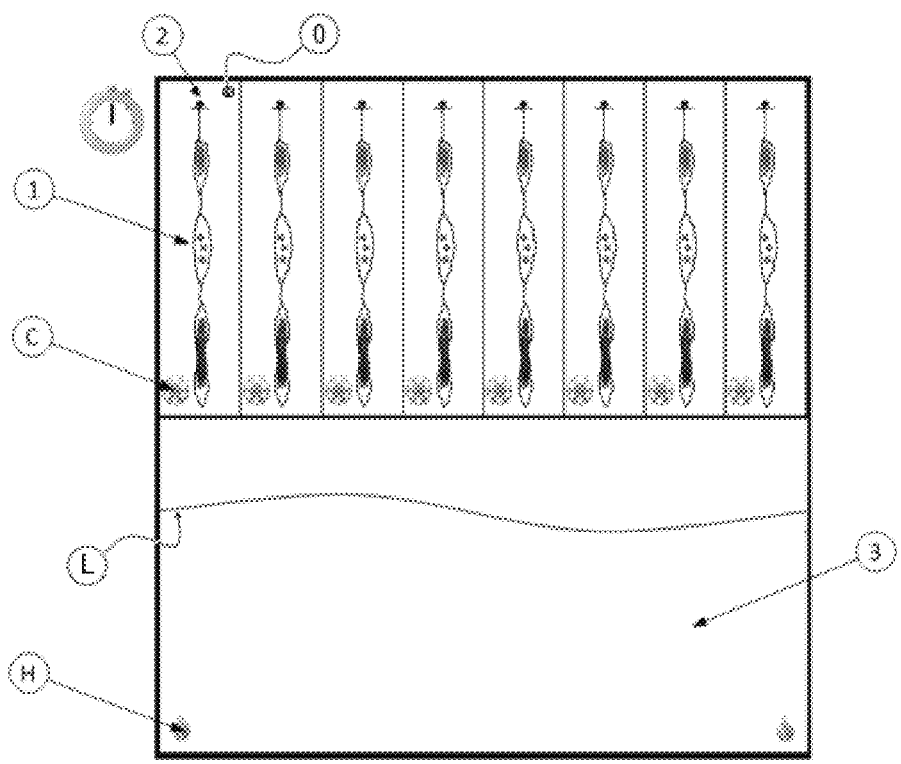
FIGS. 3 to 6 depict the system, the steps being in the following states: preserving the bags, cooking food by moving the bags in the hot liquid and keeping the bags in a warm zone ready to be served.

Now referring to FIG. 2, a family wanting an immersion cooking experience requires several additional degrees of complexity. Although immersion cooking allows each meal to be different from one another, this also requires, as for the single meal, that various components 1 be taken from the fridge 10 and/or freezer, and placed into the immersion cooking apparatus 11 under the preferred conditions indicated on each and every package. Understandably, more meals will result in more components to monitor with additional computation for the time at which each element should be added to the immersion cooker for simultaneous completion of the meals. It will thus be more complex to have all elements ready for serving at the same time 12.

To summarise the state of the art of immersion cooking, such a technique requires several meal components 1 all cooked in the same apparatus 11 at various time intervals and have another apparatus for either keeping the meal warm or for thawing one or more meal elements. The immersion cooking thus required the cook to adequately monitor the cooking time of each and every element while initially taking into account the time at which each should be placed in the immersion cooking apparatus to ensure that all elements are ready for serving 12 simultaneously or are ready at one or more predetermined time intervals The present invention will provide a solution to reduce the complexity of immersion cooking. In the present embodiment, a cooking method comprises the steps of «sous-vide cooking. These steps generally comprise immersing one or more bags containing food within a temperature-controlled liquid for a specific duration. The temperature-controlled liquid shall also circulate in order to provide an optimal energy transfer process.

The cooking system and method according to the present invention integrates food storage and preservation until cooking is required.

In a preferred embodiment, the cooking process is automated inside the cooking system apparatus. The present apparatus allows the liquid of the immersed food to be kept at the appropriate temperature, ensure circulation of the liquid around the bagged food to have a constant energy transfer from the liquid to the food during cooking period, and allow cooking of the various sections of a bagged meal.

The bag may comprise a unitary component (i.e. Sous-vide smoked meat) or a plurality of components (i.e. meat, vegetables . . . ). A multi-compartment bag comprises a plurality of sous-vide sections having various cooking times as shown in FIG. 20*a*)

According to an embodiment, the present invention comprises the entire process for producing a single meal composed of a plurality of food components held in immersion cooking bags. The bags are stored and preserved in a preservation zone, each component or bag sections are then cooked in temperature-controlled liquid for a specific time before being ready to be served. The system comprises a computer program executing an algorithm to calculate the appropriate cooking sequence for the different sections of the bag to be optimally cooked and be ready at the same time. The calculation program may take a plurality of factors such as the singularity or plurality of compartments in the bagged food to be cooked, the type of food contained in each section of the bag and the cooking temperatures of each food. Additionally, the calculation program ensures that all food components are ready at the same time upon completion of the process.

An important aspect of the present method and system for cooking food is that the food must be inserted in the different sections of a bag following the sequence required by the cooking instructions. As such, the food requiring a longer cooking time shall be placed in the lower sections of the bag as these sections are typically immersed or submerged at first during the cooking process. Following the same principle, the food requiring less cooking time shall be placed in the higher section of the bag, as they are typically immersed or submerged at a later stage during the cooking process.

As an example, let take a meal comprising chicken, vegetables and mashed potatoes. The bag must comprise chicken, vegetables and mashed potatoes and the cooking instructions must specify that the chicken must be cooked for 18 minutes (duration) at 65 degrees Celsius (liquid temperature), the vegetable must be cooked during 8 minutes at 65 degrees Celsius and the mashed potatoes during 5 minutes at 65 degrees Celsius. As such, the bag shall comprise three sections wherein the chicken is placed in the lowest section, the vegetables are placed in the middle section and the mash potatoes are placed in the highest section. Still in the same example, the apparatus shall first immerse the section containing the chicken for 10 minutes. At 10 minutes, the apparatus shall further immerse the vegetable for 3 minutes (keeping the chicken immersed) and immerse the mash potatoes after 13 minutes from the beginning. All section shall be removed from the liquid after 18 minutes, ready to be eaten. One skilled in the art shall understand that any other combination is possible as the present example does not limit the present invention.

One skilled in the art shall understand that even if the present illustration describes a bag comprising multiple sections each comprising food, the present system may be adapted to use one or more bags comprising a single food section. Thus, in such an embodiment, the cooking instruction would specify only cooking duration and a single height of cooking.

In the same manner as for the single meal process, the multi-meal process uses a computer program implementing a computation algorithm that executes the appropriate cooking sequence for each section of one or more bags to be optimally cooked. Additionally, in an embodiment cooking multiple meals, the computer program shall use further parameters defining the plurality of meals which have different cooking times and temperatures. Similarly, the computer program also ensures that all the sections of each bag to be cooked are ready at the same time and/or at predetermined time intervals upon completion of the process. In another embodiment, the system may be configured to allow some bags to be cooked simultaneously and others to be ready at predetermined time intervals. Such a feature is advantageous in the case of usage in a commercial kitchen or a restaurant where it may be required to have a plurality of meals to be ready at the same time. In such an embodiment, the apparatus may be configured to cook different groups of meal, each group comprising a plurality of bags. The apparatus must then ensure that all the bags of a group be cooked using the same parameters of duration and temperature.

Alternatively, the system may be configured to cook a plurality of meals to be ready at different times. Also, for some meal combinations, it may be required that the system and method complete the cooking of one meal while another is still finishing cooking. In such an instance, the present cooking system and method shall remove the cooked meal and keep it resting in a warmed storage component until the completion of the longer cooking meal. Such difference in cooking time may be dealt with in different ways, depending on the optimal cooking recipe of the meal.

The system and method according to the present invention may be suitable for commercial, residential and industrial use.

Now referring to FIGS. 3 to 7, a first embodiment according to the principles of the invention, a system for automated immersion cooking uses a lowering and rising mechanism is shown. In this embodiment, the mechanism moves the one or more bags 1 within a liquid container in order to start the cooking of the food contained in the bag or to stop the cooking process of the food.

Still referring to FIGS. 3 to 7, according to this embodiment, the automated immersion system typically comprises one or more compartments 5 configured to receive one or more bags 1 for immersion cooking, one or more bag holders 2, such as but not limited to a stand rod, a container for receiving hot liquid and keeping the liquid at a hot temperature 3 and a mechanism, shown as 20, 26, 27 and 2 to move the bag 1 in or out of the liquid contained in the container 3. In a preferred embodiment, the mechanism for moving the bag may be powered by a motor 20 allowing automated rising and lowering of one or more bags 1, such as a standard electric motor. Each bag holder 2 is attached to the moving mechanism using any attachment mean, such as a nut or a clip. To add precision to the moving mechanism, it shall be preferred to control the motor 20 using a motor controller 21 such as a standard electric motor controller connected to a controller unit 22, such as a CPU or a computer or any computerized device. The apparatus may further comprise a manual user input device or user interface 23, such as, but not limited to, a a touch screen, a keypad, a keyboard, a computerized device connected to the apparatus, a mouse, a voice or movement recognition system or a scanner or touch screen in order to control the apparatus. In another embodiment, the apparatus may act as a client to retrieve the instructions required to cook one or more bags 1 from a remote server through the network connection 24. In a further embodiment, a program acting as a server may be run or integrated within the apparatus allowing a client to request the cooking of one or more bags 1.

For each compartment 5 comprised in the apparatus, the apparatus shall comprise at least one bag holder 2, at least one mechanism for moving the bag 27, at least one motor 20 and at least one motor controller 21. Thus, as an example, if 10 compartments 5 are present, the apparatus shall comprise at least 10 bag holders 2, 10 motors 20 and 10 motor controllers 27. However, the apparatus typically comprises a single controller unit 22, a single thermal circulator 25 and a single "Network connection" 24. However, in other embodiments, one may configure the apparatus to comprise a plurality of controller units 22, of thermal circulators 25 and of network connections 24. The liquid contained in the liquid container 3 is maintained at a constant level (L) and the controller unit 22 is configured to control the motor 20 to immerse a bag 1 at the appropriate level L for cooking one or more specific sections of the bag 1. Typically, a compartment 5 shall be embodied in any shape or any size comprising a bottom aperture to allow the rising and lowering of the bag 1 in the liquid container 3.

In another embodiment, the level of liquid (L) may be varied using a liquid circulation system (not shown), such as an outlet valve and an inlet valve, a liquid tank and a pump, in order to adapt for different types of bags 1 and/or to optimize the required volume of liquid.

In a preferred embodiment, the motor 20 moves a long threaded shaft or elongated member 27 which comprises an attachment mean 26, such as a "coupling nut", moving up and down. The bag holder 2 is attached to the threaded shaft 26, holding the bag 1 in order to lower and raise the bag 1 from the liquid container 3.

In another embodiment, the apparatus may control the temperature of the storing zone to maintain the uncooked bags 1 at a preservation temperature. In such an embodiment, the temperature may be controlled for each individual compartment 5 or may be the same for all compartments 5. To ensure that a bag 1 is isolated from the liquid container 3, each compartment 5 may comprise a door 4 located at the bottom portion of the compartment 5. When the door 4 is open, the bag 1 may freely be lowered to the liquid container 3 or raised in its compartment 5. The door 4 shall remain open during the cooking process as the bag 1 may be partially immersed. The said door 4 is typically embodied as a flapping door being opened when the bag 1 is lowered and automatically closing when the pressure of the bag lis released during the rising process. The temperature of each compartment 5 is preferably individually controlled in order to provide temperature to keep a bag 1 warm, typically at the end of the cooking process, and to preserve/conserve the food prior to starting the cooking process.

The liquid container 3 typically comprises a thermal circulator 25 allowing the thermal transfer to be optimized and a liquid heater (not shown). Any thermal circulator 25 may be used, typically comprising a heating element, a thermal sensor, a liquid circulator, such as a propeller, and a microcontroller.

In a further embodiment, the controller unit may be connected to the thermal circulator in order to dynamically change the temperature of the liquid during the cooking process in order to adapt to different cooking requirements of a specific food. In such an embodiment, the controller unit must calculate the variation of the temperature and the reduced or lengthen cooking time being function of the current temperature of the liquid and the controller unit must send the required signal to start or stop the heating process and/or thermal circulation process.

The FIGS. 3 to 6 further comprises the indications concerning the hot liquid level (L), the cold temperature area (C) and the hot temperature area (H). One skilled in the art shall understand that the apparatus typically comprises any known module or unit to keep the gas, air or fluid of the compartment 5 at different temperatures within a range of warm to cold.

Still referring to FIGS. 3 to 6, the steps related to the method for automated immersion cooking using a lowering and rising mechanism are shown. The method comprises the steps to preserve bags 1 at temperatures allowing preservation of the food (FIG. 3), to lower one or more bag 1 within the liquid container 3 (FIG. 4), to fully or partially immerse one or more bags 1 into the liquid container 3 (FIG. 5), to raise the one or more immersed bags 1 within one or more compartments 5. Now referring to FIG. 3, the one or more bags 1 are kept at a temperature allowing the preservation of the food contained in the bag 1(C), typically being a cold temperature such as the temperature found in refrigeration or freezing appliances.

Figure 4:
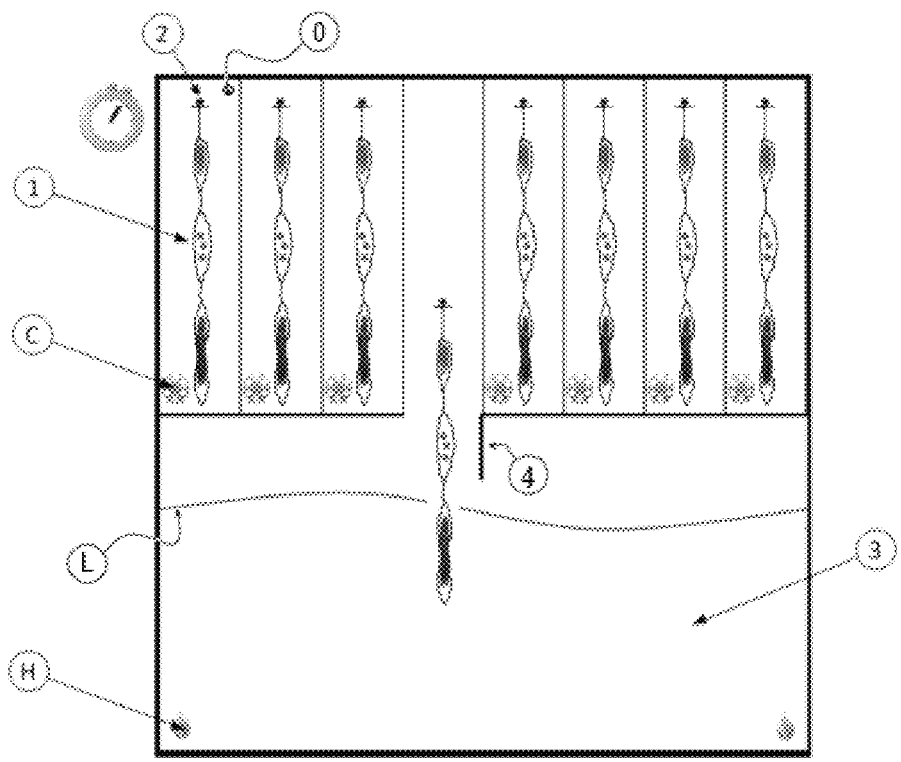
Figure 5:
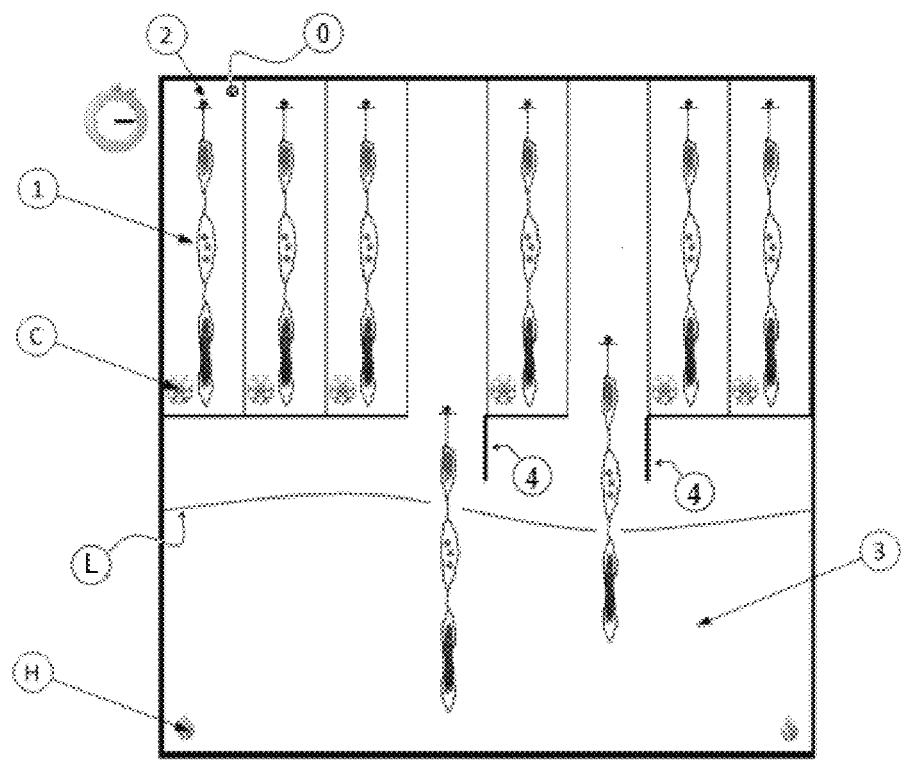
Figure 6:
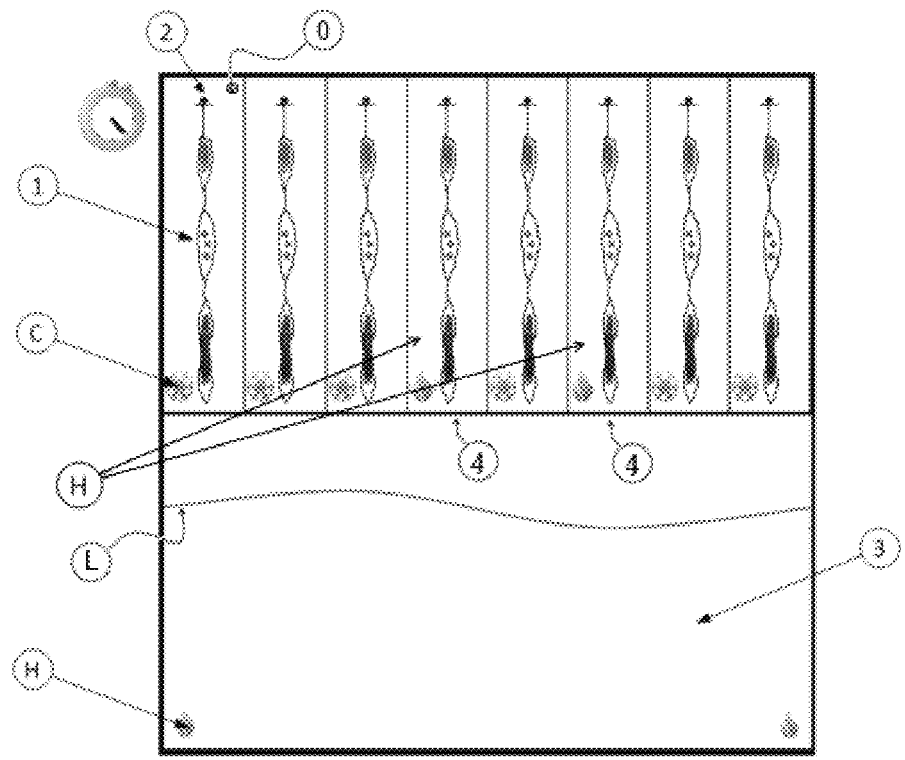
Figure 7:
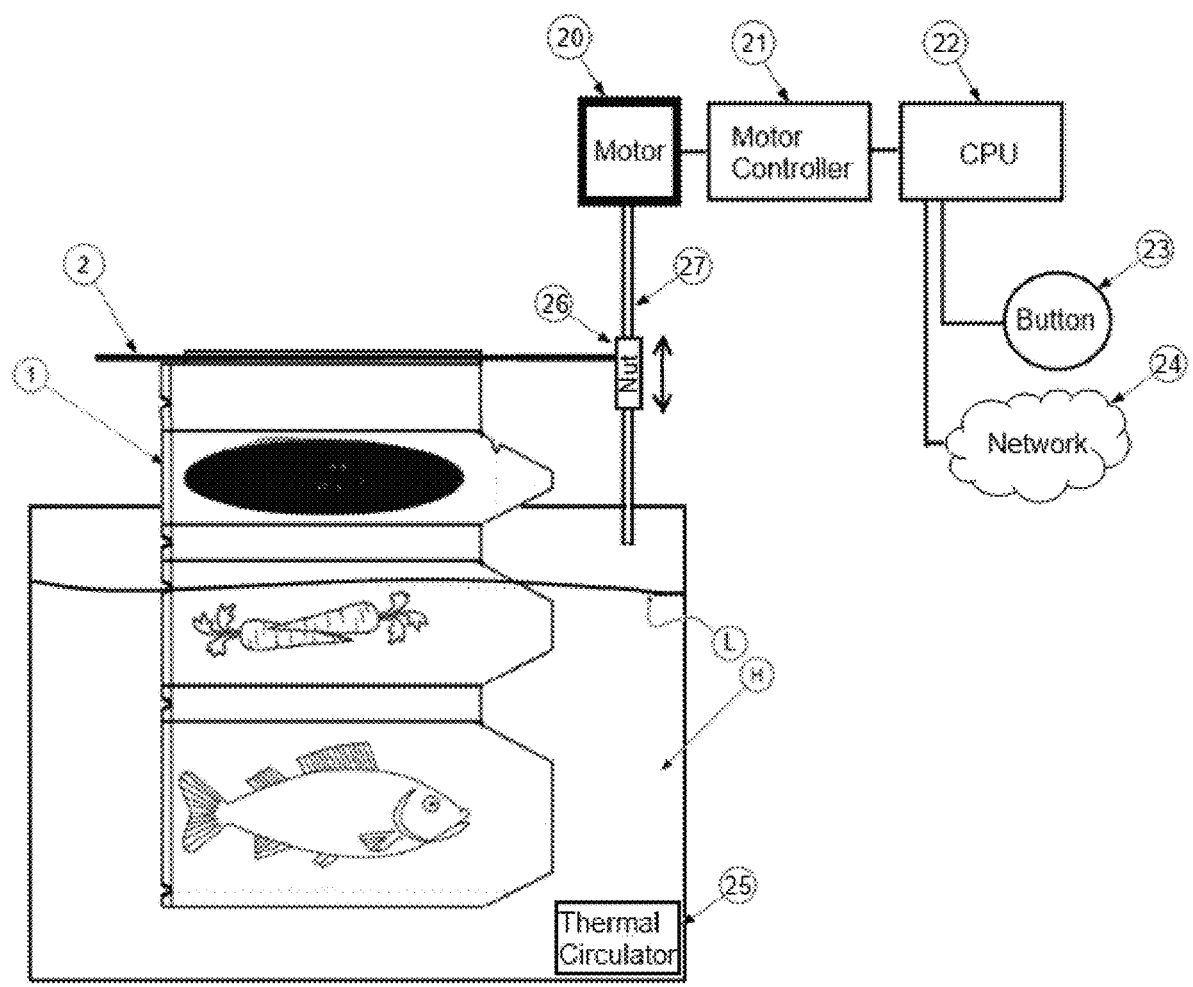
FIG. 7 depicts the system and its components allowing the bags to be moved within a liquid container in accordance with the principles of the present invention.

Now referring to FIG. 4, during the step to lower one or more bags, the door 4 of the compartments 5 containing the selected bags 1 to be cooked are opened and the one or more selected bags 1 are lowered in liquid container 3. Additionally, the bag 1 may fully or partially be submerged in the liquid container to cook only the desired food components before or after the others (FIG. 4). As an example, a second bag may be lowered to start the cooking process while a first bag 1 is totally or partially submerged. Now referring to FIG. 5, in another example, both first and second bags 1 may be lowered at different heights to allow the cooking of the lowest section of the second bag and the start of the cooking one or more uncooked sections located at a higher height of the first bag. Now referring to FIG. 6, at the end of the entire process, all the sections of the selected bags 1 are cooked, and each door 4 of the in-use compartments 5 are closed after the rising of each bag. Thus, the meals may be kept at a temperature ready to be served while waiting in a warm zone (FIG. 6).

In a further embodiment, the request to start a cooking process may be triggered by a computerized device having access to the apparatus through a network, such as, but not limited to, a laptop, a smart phone, a tablet, a smart watch, etc. In such an embodiment, the controller unit 22 may be configured to run a computer program acting as a server to respond to the request for cooking or a remote computer running a computer program acting as a server may respond to the request from the computerized device. The computer program must calculate and store the cooking instructions in a data source. The apparatus may be triggered of new instructions or may send a request to the server at specific time intervals to retrieve the available cooking instructions stored in the data source.

Figure 8:
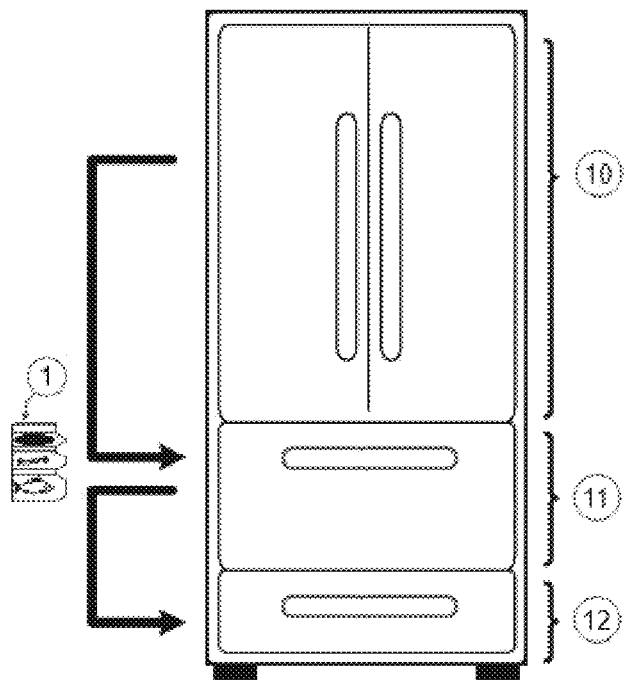
FIG. 8 shows an automated immersion system in accordance with the principles of the present invention embodied as a «Refrigerator» size apparatus.

FIG. 8 shows an automated immersion system embodied to be included in a «Refrigerator» size apparatus. In such an embodiment, the bags 1 are stored in a zone 10 allowing the preservation of the food comprised in the bags 1, such as refrigeration or freezing temperatures. The bags 1 are cooked in the cooking zone 11 which comprise a liquid container fully or partially filled with liquid maintained at a temperature allowing cooking of food. The apparatus further comprises a zone kept at temperatures to preserve the food at a warm temperature 12, preferably the same gas, air or fluid temperature as the liquid temperature, such as 70 degrees Celsius. Such an apparatus may comprise an automated or robotized arm raising or lowering the bags 1 from one zone to another during the cooking process. Typically, the arm shall move the bags 1 from the storage zone 10 to the cooking zone 11 and from the cooking zone 11 to the warm zone 12.

Figure 9:
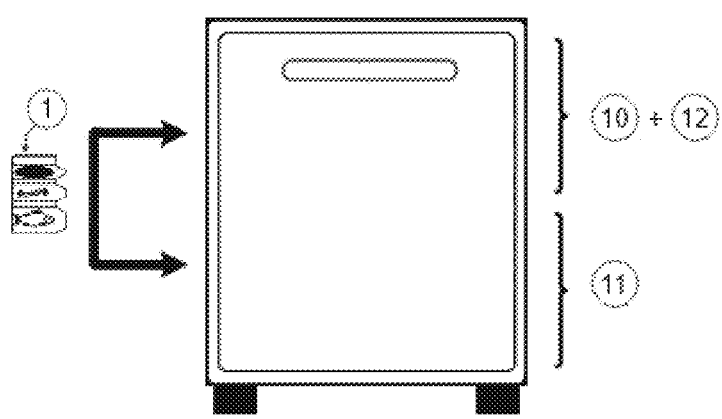
FIG. 9 shows an automated immersion system in accordance with the principles of the present invention embodied as a «Dishwasher» size apparatus.

Now referring to FIG. 9, another embodiment of the automated immersion system embodied as a «Dishwasher» size apparatus is shown. Similarly to the apparatus shown in FIG. 3-6, the temperature of the compartments 5 is either changed and maintained at a temperature to preserve the uncooked bags 1 during the step of preservation of the food 10, typically prior to the start of the cooking process. The temperature of the compartments 5 may also be changed or maintained at a temperature to keep the bags 1 warm, typically to keep the cooked bags 1 at a temperature suitable for the food to be eaten. The zone is refrigerated but as soon as the door 4 opens, the temperature of the compartment 5 rises to become as hot as the liquid. By closing the door and closing the fluid entry, typically air entry, the temperature of the compartment 5 remains hot. In such an embodiment, the apparatus typically comprises an enclosure having a plurality of faces wherein one face comprises a door to access the one or more compartments 5 and the liquid container 3, is electrically powered by any electric means, such as an electric transformer and may be connected to a liquid input pipe and a draining pipe.

In another embodiment of the "Dishwasher" format, the storage zone may comprise individually controlled temperature compartmentalized sections to isolate each bag 1 from another one.

The apparatus may, for sanitary purposes, remove liquid contained in either the liquid container or any compartment 5 and fill the liquid container or the compartment 5 with unused liquid, such as fresh water, at regular times in order to prevent bacteria growth. For such maintenance task, the apparatus may comprise any mean or method to remove liquid from the liquid container or any compartment 5, such as a liquid outlet or a liquid pump. As such, the apparatus may be set for regular washing cycles. Such cycles may include circulating boiling water through the liquid container while no cooking is required to ensure cleaning. Additionally, a cleaning process may include high heating of the empty tank to ensure no living bacteria is left in the tank while sequentially flushing the tank with water.

Now referring to FIGS. 10 to 15, another preferred embodiment for automated immersion cooking using a variable liquid level is shown. As such, according to this embodiment, the bags 1 are maintained at a specific height within an impervious compartment 5 as liquid is poured or drained of the said compartment 5.

Still referring to FIGS. 10 to 15, according to this other preferred embodiment, the automated immersion system typically comprises one or more compartments 5 each comprising at least one liquid outlet valve 6, at least one fluid (liquid/air) inlet valve 7, at least one fluid outlet valve 8, at least one temperature sensor 30 and at least one liquid level sensor 31. Each compartment 5 typically comprises at least one bag holder 61 to keep the one or more bag 1 at a specific level within the compartment 5. One skilled in the art shall understand that each compartment 5 may hold more than one bag, typically all the bags 1 containing food having the exact set of cooking instructions. The apparatus further comprises a refrigeration unit, such as an air compressor 32, at least one tank to store cold air 33, at least one tank to store hot liquid 34 and a pump unit 35 to allow the liquid level (L) to be changed in the compartment 5, The apparatus may further comprise a manual user input device or user interface 23, such as a touch screen, a keypad, a keyboard, a computerized device connected to the apparatus, a mouse, a voice or movement recognition system or a scanner in order to control the apparatus. The apparatus may further comprise at least one controller unit 22, such as a computer, a CPU, a computer or any computerized device connected to the temperature sensors 30, the liquid sensor 31, the inlet and outlet valves 6, 7 and 8, the user input device or the network connection 24 (if present). Each compartment 5 is typically made of rigid impervious material that may withhold hot liquid temperatures. An apparatus typically comprises a plurality of compartments 5.

In another embodiment, the apparatus or the controller unit 22 may act as a client to retrieve the instructions required to cook one or more bags 1 from a remote server through the network connection 24. In a further embodiment, a computer program acting as a server may be run by the apparatus or integrated within the apparatus allowing a client to request the cooking of one or more bags 1.

In a further embodiment, the request to start a cooking process may be triggered by a computerized device having access to the apparatus through a network, such as, but not limited to, a laptop, a smart phone, a tablet, a smart watch, etc. In such an embodiment, the controller unit 22 may be configured to run a computer program acting as a server to respond to the request for cooking or a remote computer running a computer program acting as a server may respond to the request from the computerized device. The computer program must calculate and store the cooking instructions in a data source. The apparatus may be triggered of new instructions or may send a request to the server at specific time intervals to retrieve the available cooking instructions stored in the data source.

The controller unit 22 controls the inlet and outlet valves 6, 7 and 8 in order to let air or hot liquid in and out of a compartment 5. The refrigeration unit allows the air to circulate through any compartment 5, as needed. The pump unit 35 keeps the hot liquid circulating through any compartment 5 as needed. The hot liquid tank 34 keeps the liquid at a predefined temperature using any heating mean. The controller unit 22 uses the temperature sensor 30 output value to calculate the volume of cold air to be inputted or outputted in the compartment 5 through the air inlet and outlet valves 7 and 8 and to calculate the volume of hot liquid (L) to pump in or out through inlet and outlet valves 6 and 7 during the cooking process in order to keep the temperature at the specific level for cooking the food contained in the one or more bag 1 located in each compartment 5 (i.e. meals can be cooked at different temperatures). The process is started by pushing the corresponding button 23 or sending a request by the network 24.

Furthermore, the controller unit 22 may be embodied as a microcontroller configured to fetch or retrieve the cooking instructions from a remote server. The server may be located on a remote network 24. Furthermore, the microcontroller may be configured to retrieved instructions stored in a memory device located on the apparatus or accessible by the apparatus, such as volatile or non-volatile memory, hard drive, flash memory or any other storage mean.

The FIGS. 10 to 15 further comprises the indications concerning the hot liquid level (L) and the hot temperature area (H). One skilled in the art shall understand that the apparatus typically comprises any known module or unit to keep the air of the compartment 5 at different temperatures within a range of warm to cold.

Referring to FIGS. 10 to 14, the steps of the method for automated immersion cooking using a variable liquid level are shown. The method comprises the steps to insert a bag 1 in a compartment 5, to maintain the temperature of the compartment 5 at a temperature to preserve bags 1 containing uncooked food and outlet valve 8, to completely or partially fill the one or more compartments 5 with liquid maintained at a temperature to allow cooking, wherein the level of liquid is further maintained at a specific height in the compartment 5 to cook one or more sections 67 (see, as an example, FIG. 21a) of a bag 1 to be cooked. The method further comprises the step of completely or partially draining the one or more compartments 5 containing filled liquid at a temperature to allow cooking.

The preservation of the bag 1 may be realized by circulating air through the inlet valve 7. The filling of liquid within the compartment 5 is typically executed by opening the inlet valve 7 of the selected compartments 5 and controlling the pump 35 to push liquid into the compartment 5. The draining is typically realized by opening the outlet valve 6 and letting the liquid to be pumped in the hot liquid tank 34.

Figure 10:
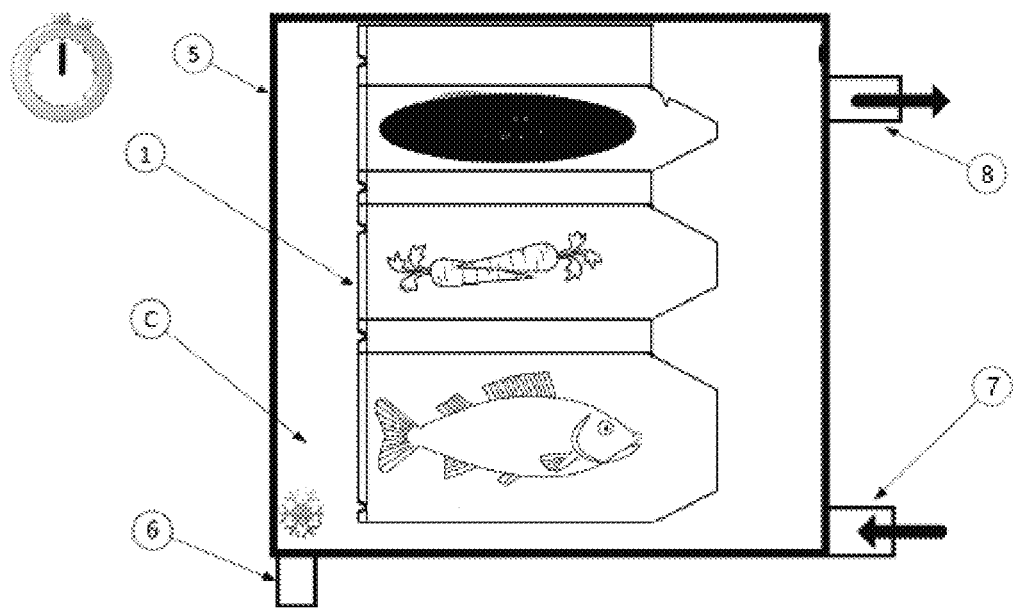
FIGS. 10 to 14 illustrate the system in accordance with the principles of the present invention embodied to allow a variable level of liquid in the cooking container at the different steps of the process: preserving bags, cooking food by letting hot liquid fill the cooking container and keeping the bags in a warm zone.

Now referring to FIG. 10, a compartment 5 containing a bag 1 is shown. The bag 1 is preserved at cold temperature C while cold gas or liquid comes in and out through inlet and outlet valves 7 and 8 in order to keep the compartment 5 at a food preservation temperature.

Figure 11:
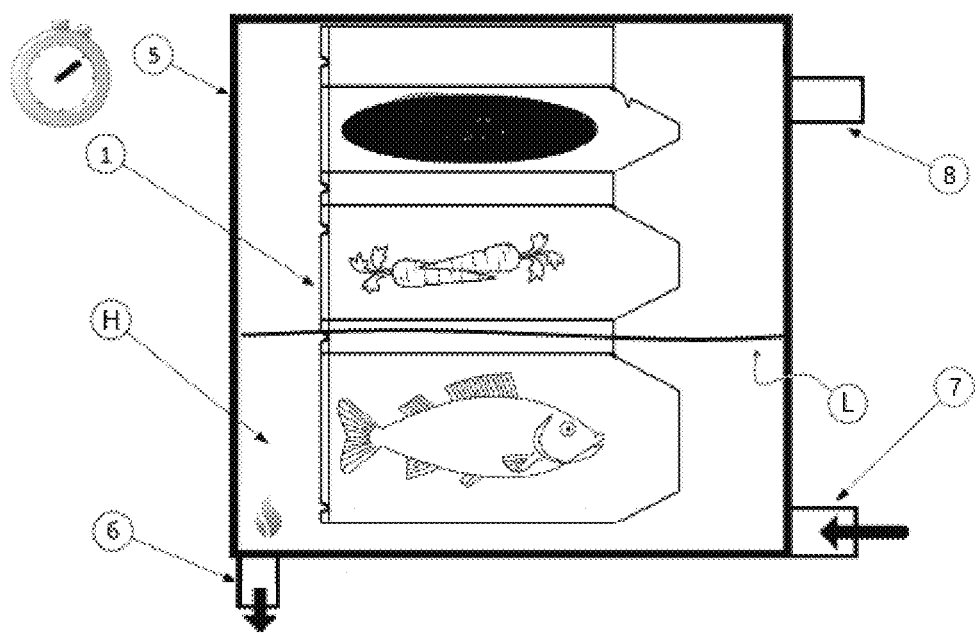
Figure 12:
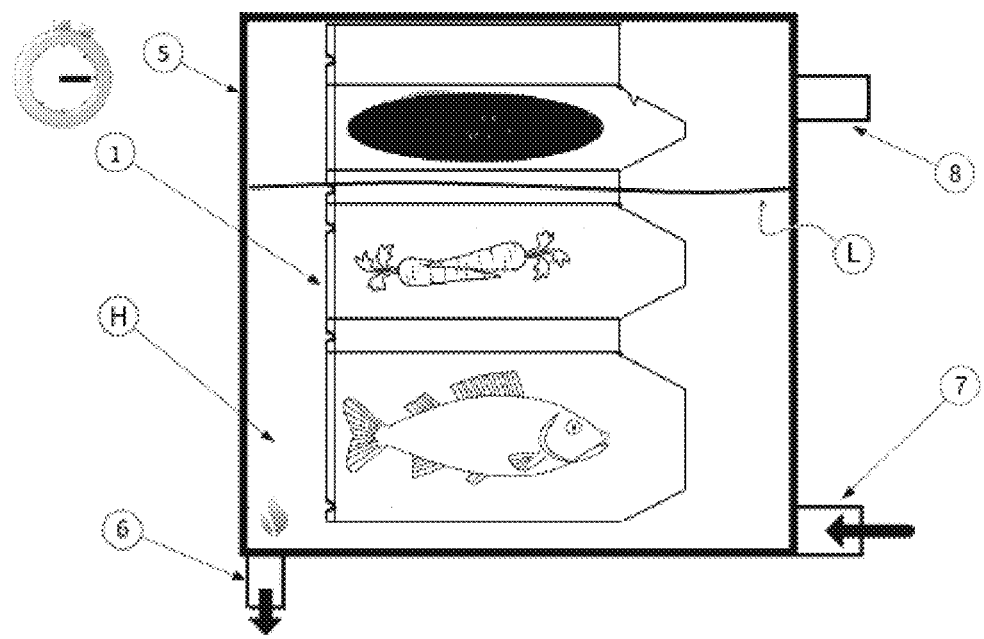
Figure 13:
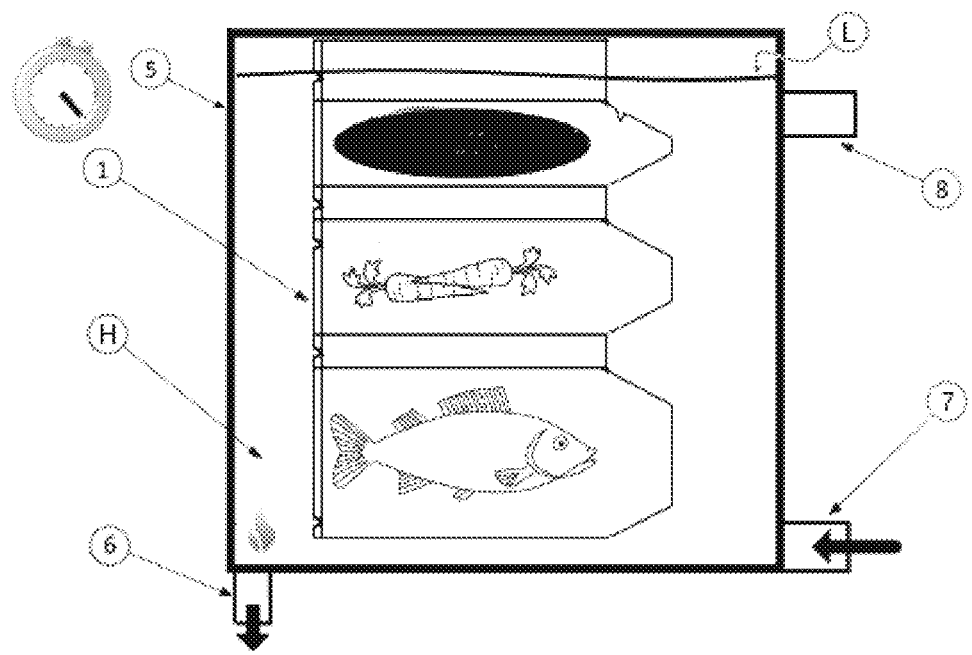

Now referring to FIGS. 11 to 13, the bag 1 is immersed at different levels L in hot liquid H. The hot liquid H is reheated and circulated at all times in order to keep the cooking temperature stable and uniformly distributed around the bag.

Figure 14:
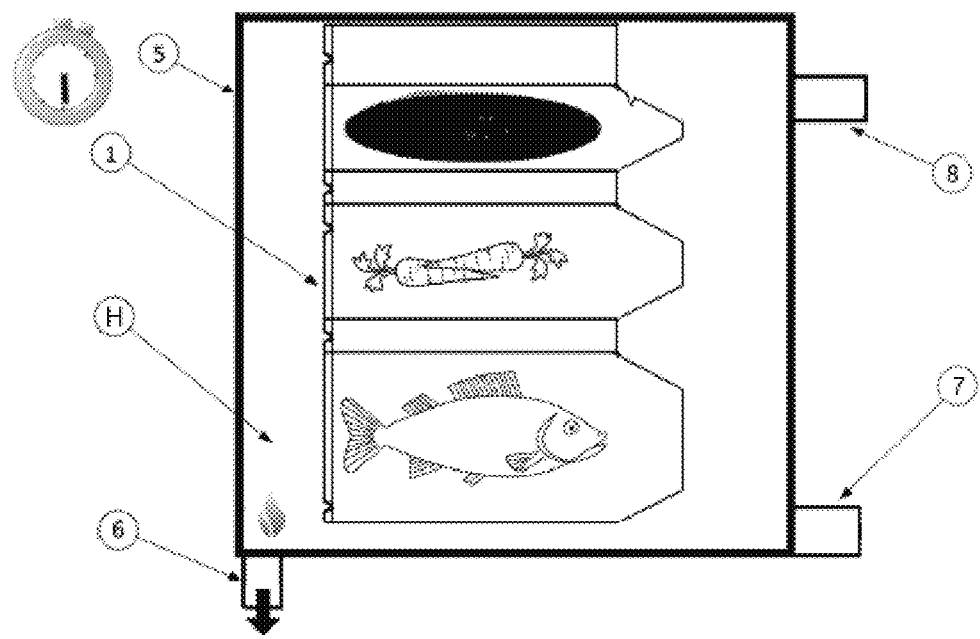
Figure 15:
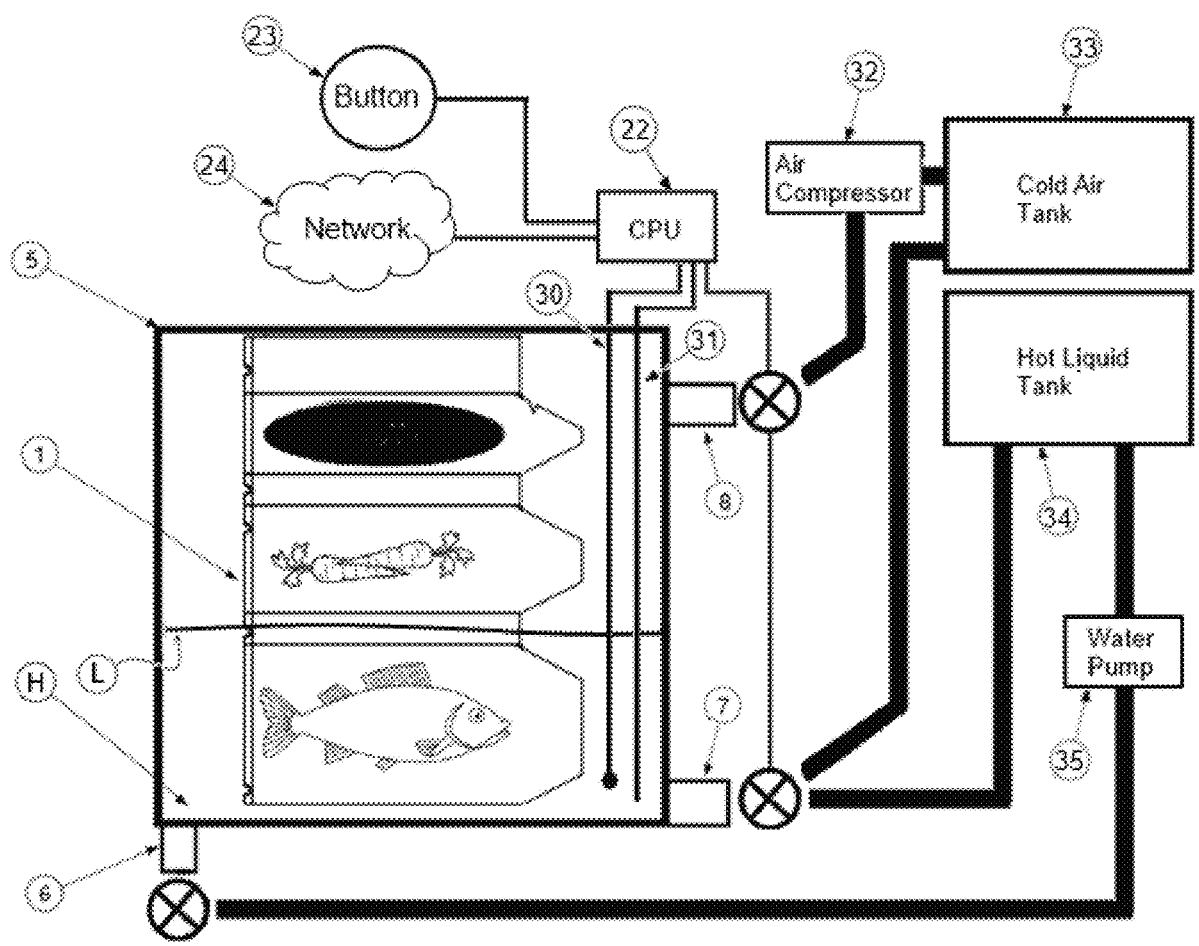
FIG. 15 depicts the system and its components in accordance with the principles of the present invention embodied to allow the variation of the level of liquid within the cooking container.

Now referring to FIG. 14, the hot liquid is partially or totally removed from the compartment 5 in order to stop the cooking process and keep a warm temperature inside the compartment 5. The meal is then ready to be served.

Figure 16:
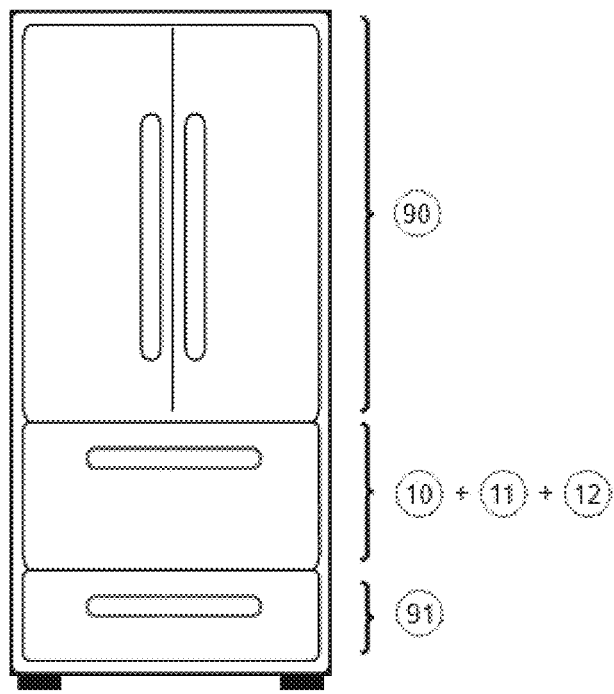
FIG. 16 shows an automated immersion system in accordance with the present invention embodied as a «Refrigerator» size apparatus.
Figure 17:
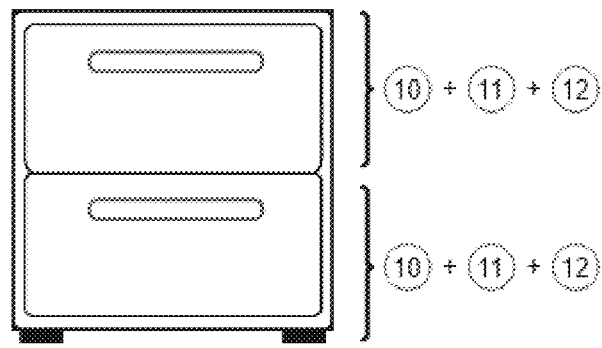
FIG. 17 shows an automated immersion system in accordance with the principles of the present invention embodied as a «Dishwasher» size apparatus with 2 drawers.

Now referring to FIG. 16, an automated immersion cooking using a variable liquid level embodied to be included in a «Refrigerator» size apparatus is shown. In such an embodiment, the apparatus comprises at least one storage unit, such as a standard refrigerator 90 and/or freezer unit 91, which may be used for their typical day to day usage or for storing exceeding bags 1. The apparatus further comprises at least one immersion cooking apparatus 10, 11, 12, typically embodied as a drawer or being an access door. The cooking apparatus typically comprises all the features to execute the method to food cook food by immersion as herein described Now referring to FIG. 17, an automated immersion cooking using a variable liquid level embodied as a «Dishwasher» size apparatus is shown. In such an embodiment, the apparatus typically comprises two drawers, each comprising an automated immersion cooking apparatus using a variable liquid level embodiment as described above and is configured to execute the method to cook food by immersion as described above, typically comprising the different steps to preserve the bags 10, to cook by immersion the food in a liquid 11 and to keep the cooked bags at a warm temperature 12.

Figure 18:
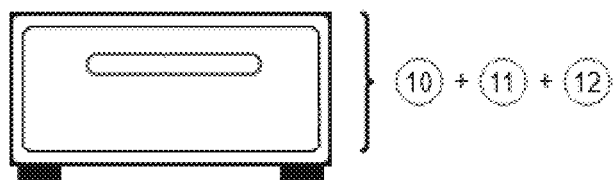
FIG. 18 shows an automated immersion system in accordance with the principles of the present invention embodied as a «Microwave» size apparatus.

Now referring to FIG. 18, an automated immersion cooking using a variable liquid level embodied as a «Microwave» size apparatus is shown. In such an embodiment, the apparatus typically comprises only one drawer comprising an automated immersion cooking using a variable liquid level embodiment as described above and is configured to execute the method to cook food by immersion as described above, typically comprising the different steps to preserve the bags 10, to cook by immersion the food in a liquid 11 and to keep the cooked bags at a warm temperature 12.

Figure 19A:
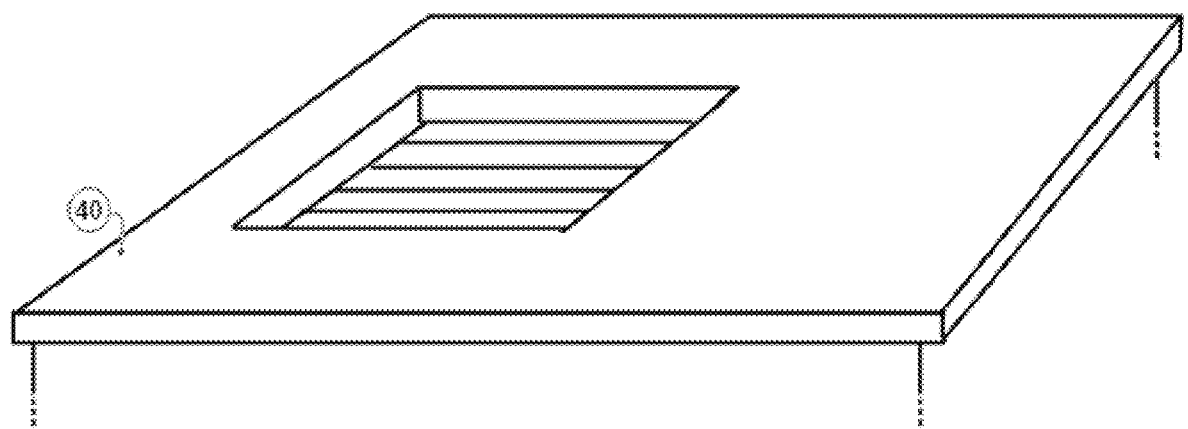
FIGS. 19a and 19b shows a perspective view and an elevation view of an automated immersion apparatus in accordance with the principles of the present invention embodied as a «Built-In Island» apparatus.
Figure 19B:
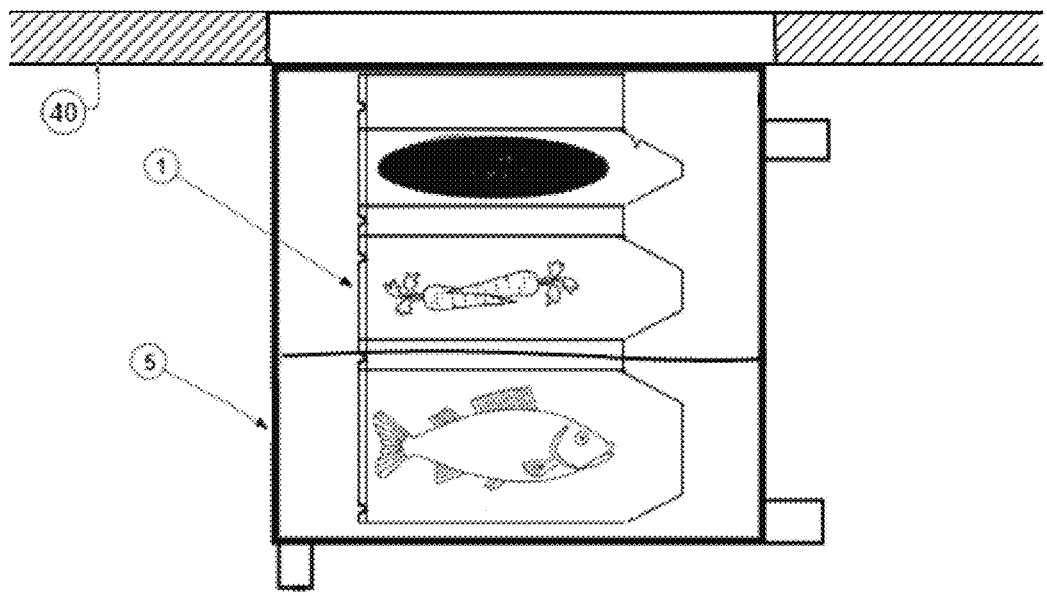

Now referring to FIGS. 19a and 19b, an automated immersion apparatus embodied as an «Under Counter» or a «Built-In Island» apparatus is shown. In such an embodiment, the apparatus is typically installed under a regular counter 40 or under a regular kitchen "island" counter 40. The apparatus comprises a door or aperture on top to allow the bags 1 to be inserted in each compartment 5 through an aperture located in the counter and aligned with the door of the apparatus. Optionally, the aperture may be covered with a door or access plate (not shown) made from rigid or semi-rigid material such as metal, glass or plastic.

Upon filling the storage compartments, the user needs to input the information on the food used to fill the storage. This information about the food may be manually inputted using a standard keyboard, by scanning their UPC Codes or RFID tags and pressing the corresponding compartment button 23 or by selecting predetermined food sequence and filling the storage compartments in the corresponding manner. In the preferred first embodiment, the controller unit 22 retrieves the predetermined food sequence from a local or remote database which stores all the parameters and instructions required to cook a bag 1 associated with a specific identification parameter and the corresponding compartment 5 number. In an embodiment accessing a remote database, the system may be connected to the database using the network connection 24 and download the required food instruction depending on the bags 1 contained in the selected compartments 5. The cooking system and method may be configured to control the temperature of the storage zone based on the information on the food. The preservation may also be computed taking into account extended period of time for food consumption.

As an example, the user may input his vacation dates and activate the preservation cycle for such a period. The system will then freeze certain meal until just before return date. Accordingly, the user will come back from vacation with unfrozen food but which will have been preserved for the absent period. In the preferred embodiment, the user will have the ability to control the preservation cycles using the Internet or his mobile phone.

When the apparatus comprises one or more bags 1 ready to be cooked in at least one of its compartments 5, the user may start the cooking process 11 directly by pressing the desired compartment buttons 23 or sending a request directly or through a server, using computer software, a web page or a mobile app. Still in the first preferred embodiment, the system and method request the instructions and information from a server accessible through a local or external network 24. The apparatus, in the case of multiple bag 1 cooking, can also synchronize cooking of various bags 1 to have them all cooked for the desired meal time.

After the cooking phase is completed, the system will turn to the "ready to be served' phase 12 wherein the apparatus may control the temperature to keep the bags 1 at warm temperatures for resting before serving.

According to an embodiment of the present invention, the cooking system may be used with conventional or specifically designed sous-vide bags 1. The specific bags are shown in FIGS. 20a-c and 21a and b. The specific bags 1 generally comprise a plurality of sections 67. Each section 67 must be impervious and typically contains various meal components sealed and deprived of air thus improving the preservation of the food. In cases where it is not desirable to remove all gas, the bag 1 may contain inert gas (e.g. Nitrogen—$N_2$). The bag 1 according to the present embodiment is typically made from standard flexible "sous-vide" certified plastics. The sections 67 of the bag 1 may either be flexible or rigid as shown in FIG. 20c depending on the preferred cooking properties of the food to be contained therein. A rigid section 67 may also be made from a thicker molded plastic or any other material capable of sustaining a rigid shape and compatible with the cooking of food (e.g. glass). Such rigid material is typically integrated to the sous-vide plastic or glued onto the bag 1 structure.

Figure 21A:
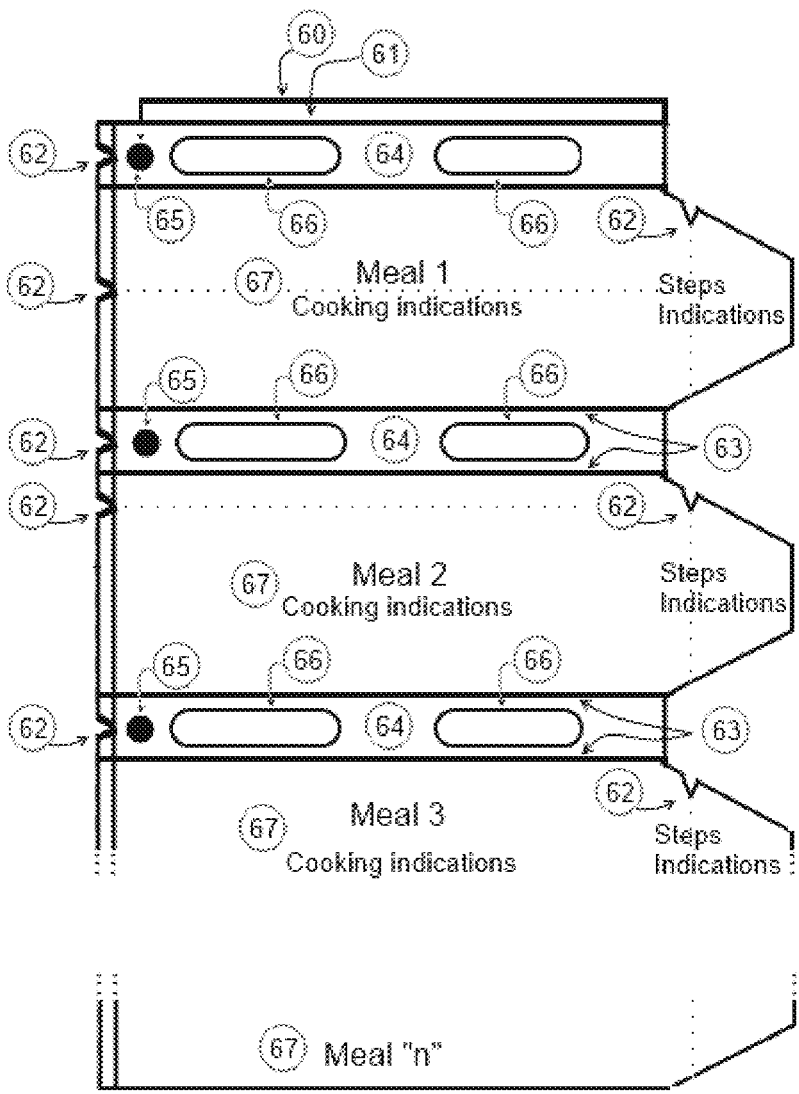
FIGS. 21*a* and 21*b* show front and side detailed views of a bag in accordance with the principles of the present invention.
Figure 21B:
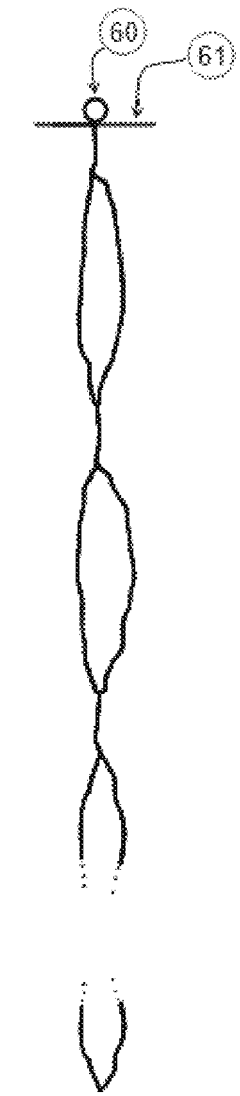

Now referring to FIG. 21a, according to one embodiment, the bag 1 comprises at least one hanging system 60 or 61 and at least one pocket having food therein. The bag 1 may also comprise a plurality of pockets, in which case, the pockets are preferably separated by gaps 64. The size of the gaps 64 must be adapted to allow variation of the liquid levels or to the uneven liquid flow of the liquid container or bag compartment 5. The pockets are preferably sealed 63 by melting some plastic with a conventional thermal sealer.

According to another embodiment, the bag 1 may comprise at least one notch 62 to facilitate the unpacking process and at least one text area for marketing purposes, identification of food and/or indications for the unpacking steps. Additionally, the pockets 67 may be sealed using alimentary glues or any glue considered non-toxic for humans. The objective in the use of alimentary glue is its ability to unglue at a specific temperature or after a certain duration thus providing a functional advantage to the product necessitating mixing at a later stage of cooking.

According to an embodiment, the bag 1 may comprise a series of "gaps" 64 and "pocket" sections 67. Understandably, the gaps 64 are optional and may be of any size and shape. The size and shape of sections 67 may be adapted to fit any type of food. Each gap 64 allows each pocket 67 to be cooked separately to avoid food to be too close to each other. A gap 64 will prevent a pocket 67 waiting to be cooked to be partially or totally immersed while one or more other pockets 67 are already immersed in the fluid for cooking.

A gap 64 may also comprise a marker 65 to identify the top and bottom of a pocket 67. Such markers 65 may have various forms and shapes such as a colored dot, a barcode, a QRCode or any other identification marker.

According to one embodiment, the automated immersion cooking system may identify the top and/or bottom of each pocket 67, using a scanner or any apparatus to identify the marker 65, and precisely position the bag 1 within the immersion tank. A gap 64 may also comprise one or more apertures 66.

According to an embodiment, the automated immersion cooking system may identify the top and/or bottom of each pocket 67, using an emitter/receptor or any system to identify the apertures, and precisely position the bag 1 within the immersion tank.

Each section 67 or gap 64 may be sealed using a bag sealer (heat), glue or alimentary glue or any other alimentary sealing process. The glue may provide the ability, by ungluing at the cooking time, to merge at least two pockets content.

Figure 22:
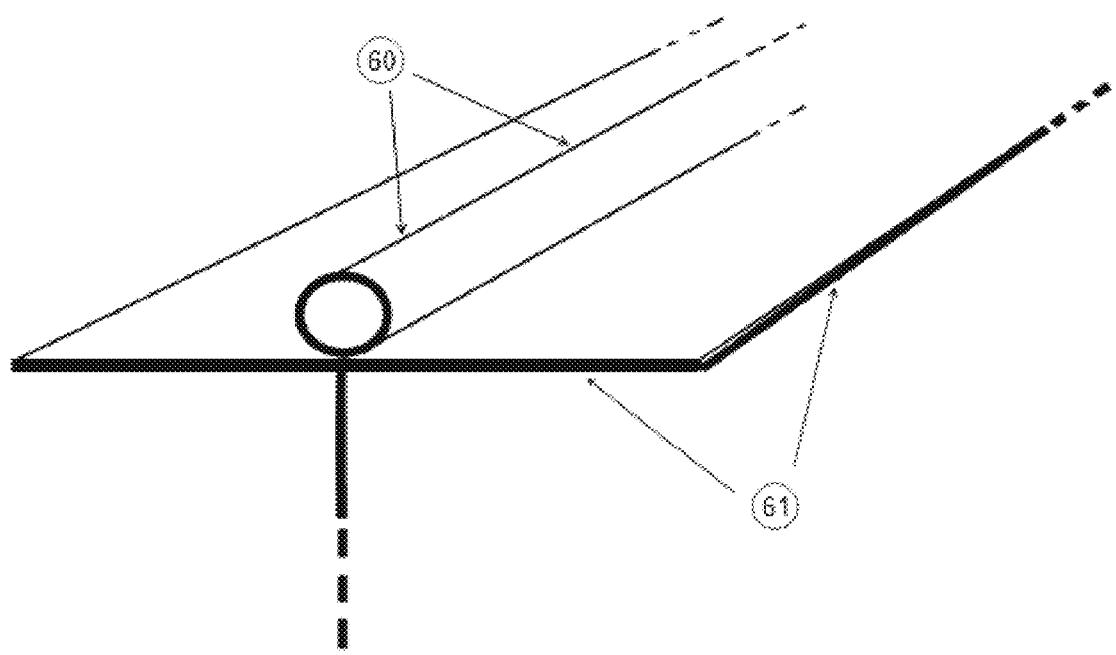
FIG. 22 shows a perspective view of the top of a bag having two different hanging systems in accordance with the principles of the present invention: a Rod Hanging System and an In-place Hanging System.
Figure 23:
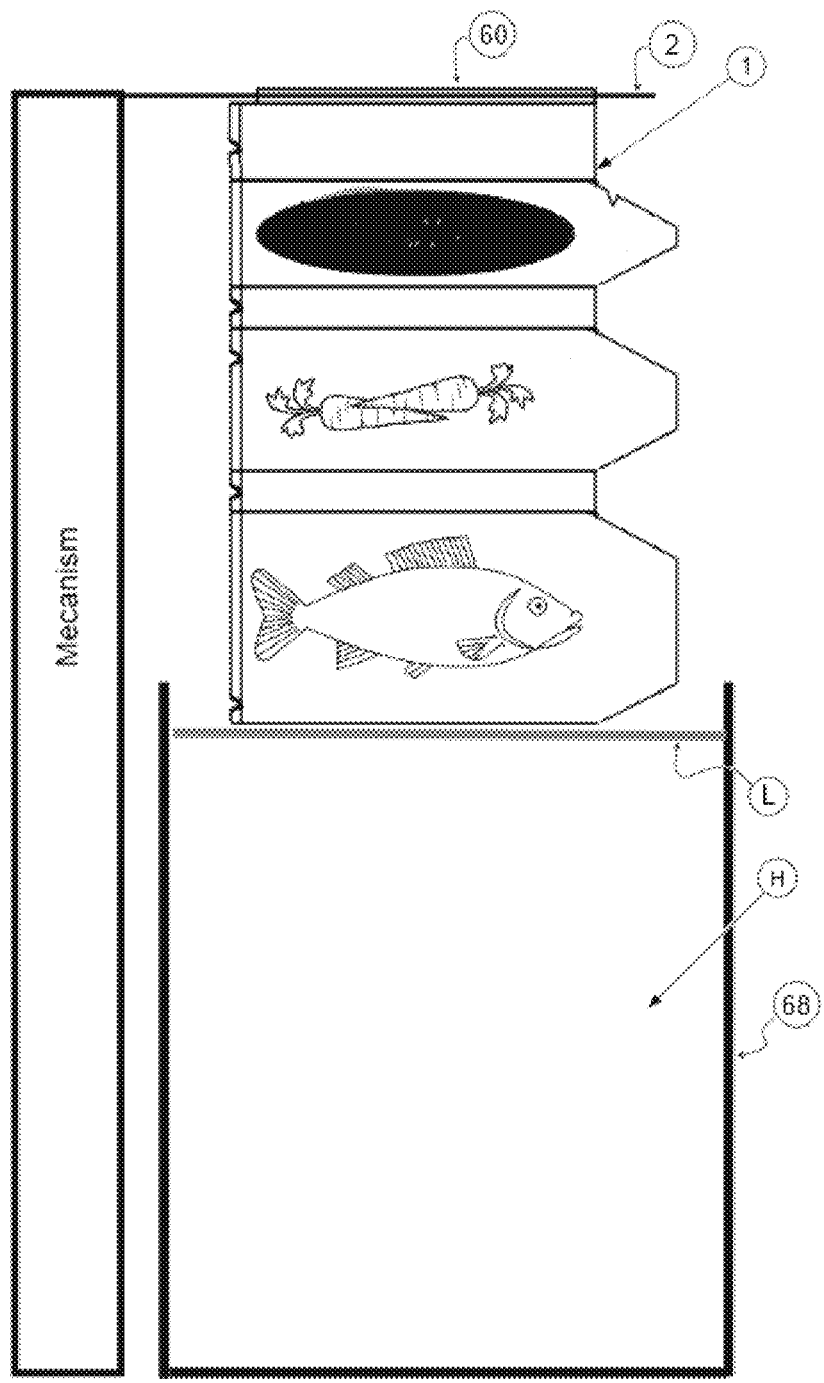
FIGS. 23 to 26 illustrate the system for automated immersion cooking, being in different steps of the cooking process using a rod hanging system in accordance with the principles of the present invention.
Figure 24:
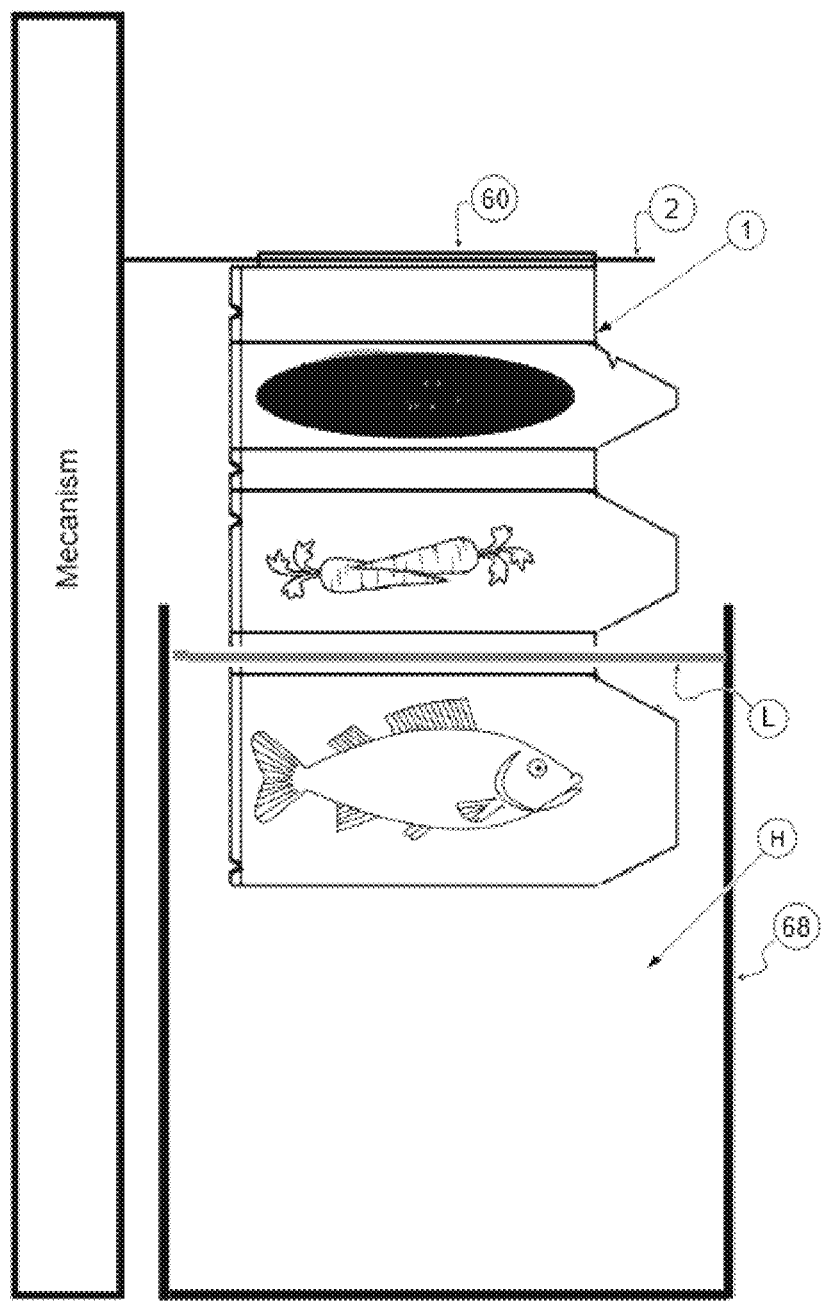
Figure 25:
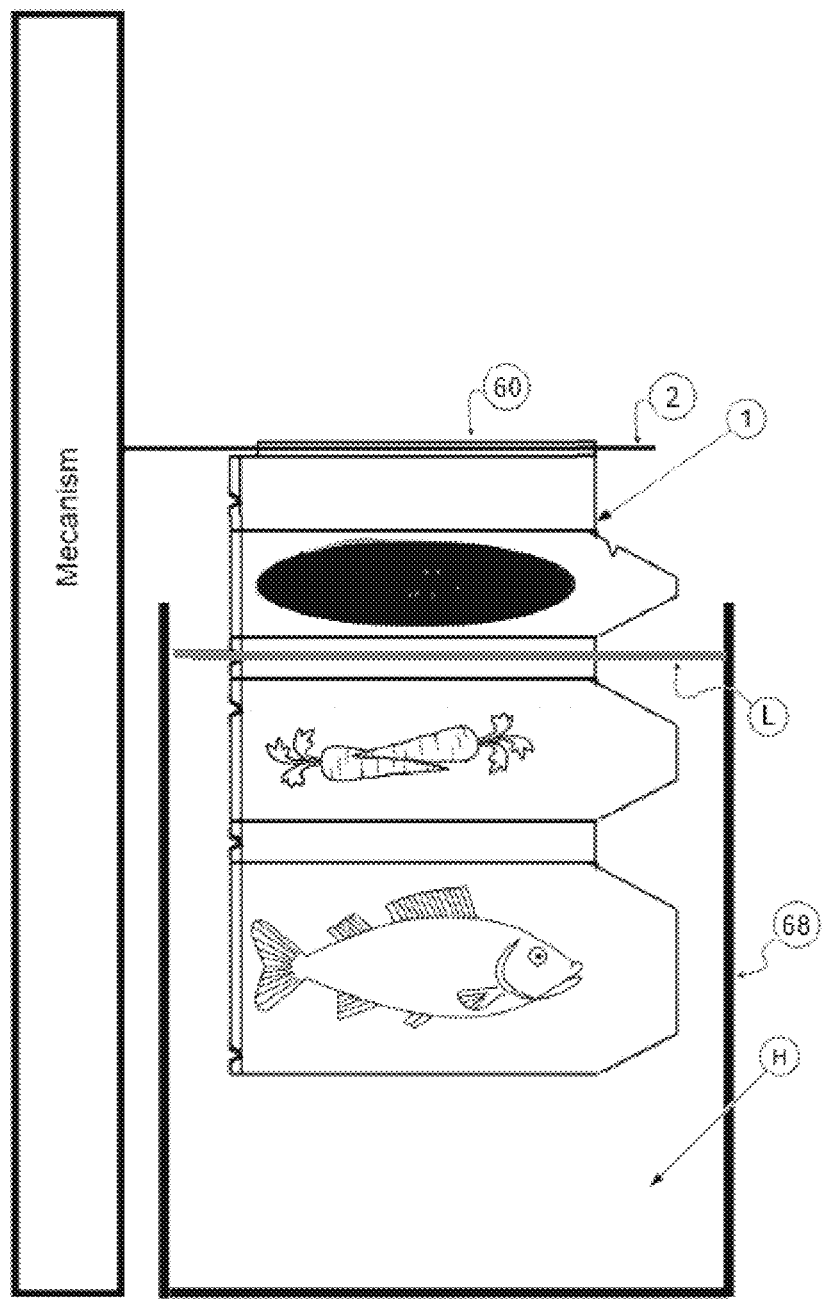
Figure 26:
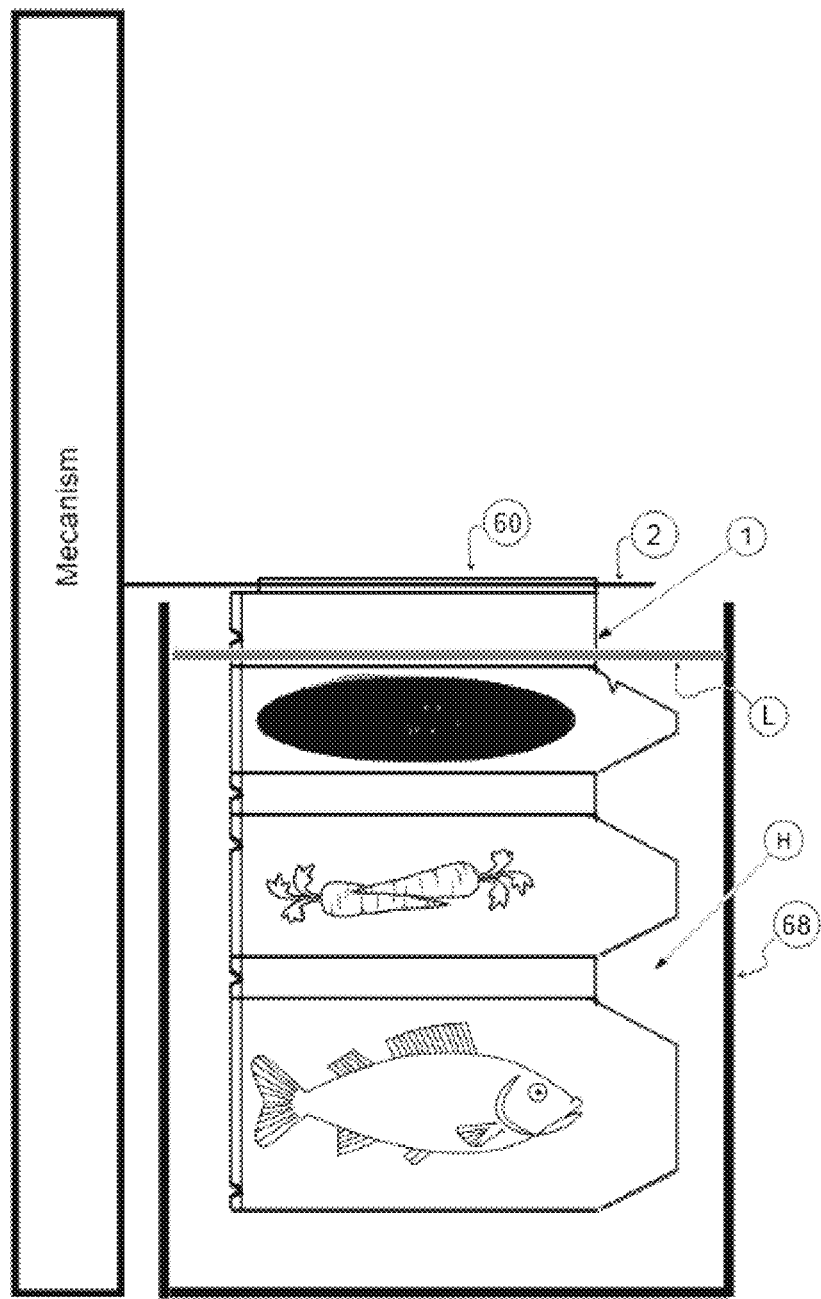
Figure 27:
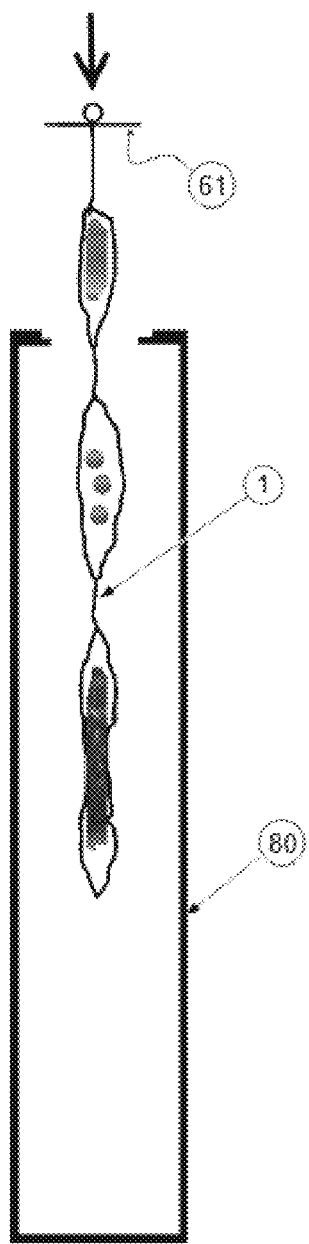
FIGS. 27 to 33 show the different steps of the cooking process using the "In-place Hanging System" in accordance with the principles of the present invention.
Figure 28:
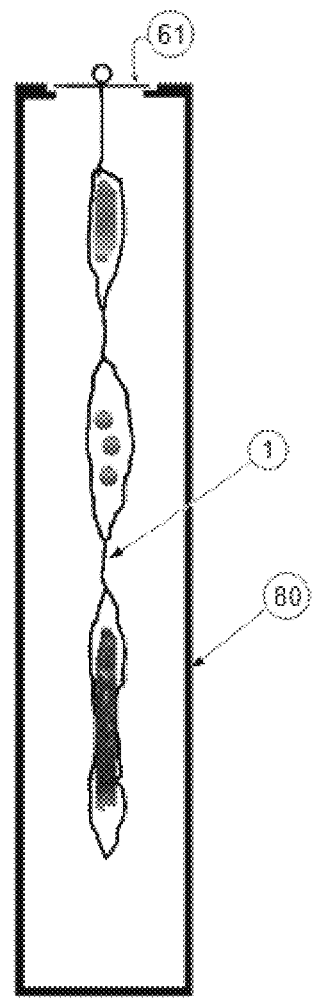
Figure 29:
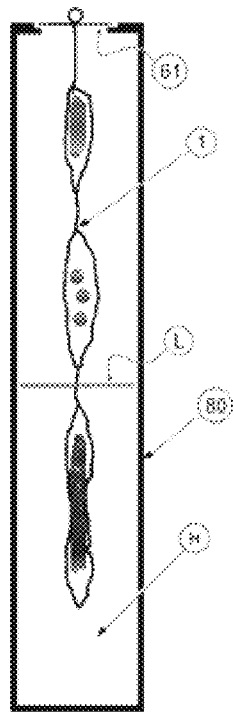
Figure 30:
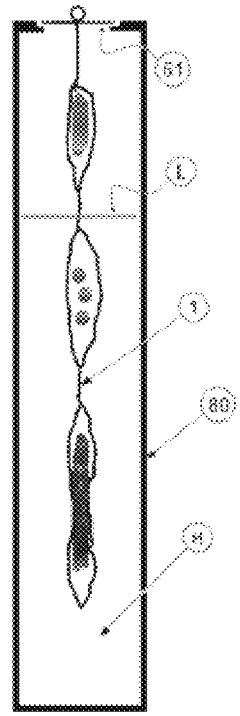
Figure 31:
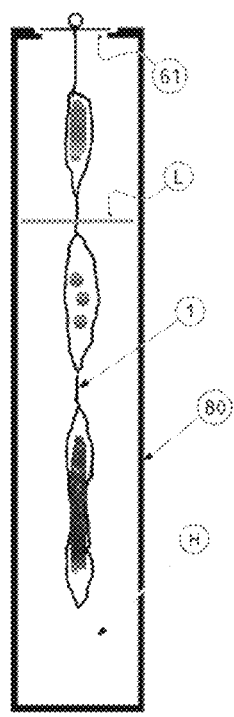
Figure 32:
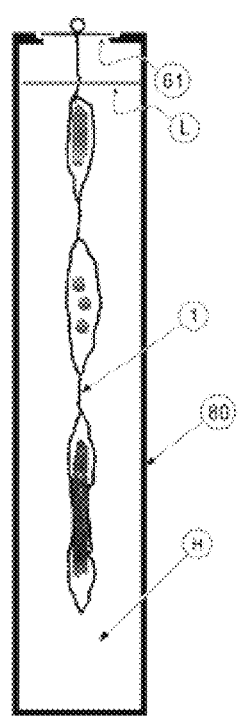
Figure 33:
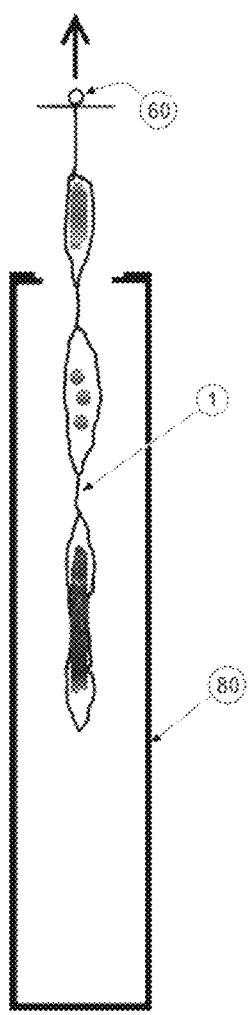

Now referring to FIG. 22, according to an embodiment, a multiplicity of hanging systems may coexist on a certain bag, thus allowing for a more polyvalent food bag. In FIG. 22, two hanging systems are shown coexisting.

Still referring to FIG. 22, one of the exemplary hanging systems shown is the "Rod Hanging System" comprising a tubular section 60, such as a sealed loop in the bag, generally shaped to accept a standing rod or any elongated member. This rod or elongated member is typically moved up and down by an external mechanism to slowly and/or by steps, lower or raise the bag 1 for each meal component to be cooked at the computed or desired time.

Still referring to FIG. 22, a second exemplary hanging system shown is the "In-place Hanging System" which comprises a plate 61 typically made of any material able to support the weight of the bag 1 filled with food, such as plastic, metal or cardboard Now referring to FIGS. 23 to 26, a method of cooking food by moving the bag 1 in hot liquid is shown. The method generally comprises a series of steps such as hanging the bag, moving down the bag 1 to specific levels at computed or desired times, cooking for a specific duration and moving the bag 1 up.

According to one embodiment, referring FIGS. 27-33, a method for cooking foods by placing the bag 1 in a compartment 5 is shown. The method comprises the following steps, in any order but typically: hanging the bag 1 on the top of the compartment, filling the compartment with hot liquid at different levels at specific times, cooking for a specific duration and totally or partially removing the hot liquid from the compartment.

Figure 34:
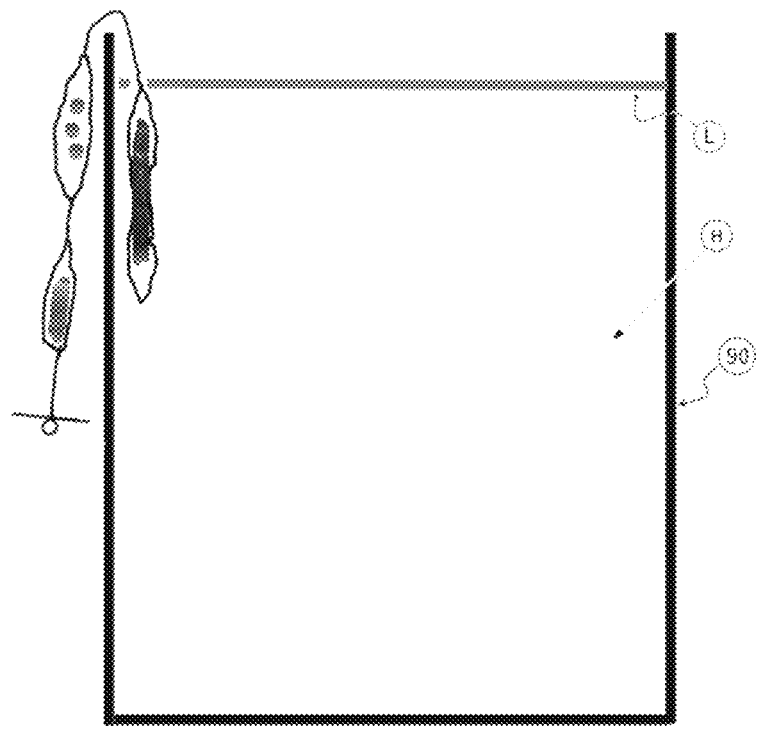
FIGS. 34 to 36 show the different steps for using a bag in a manual cooking process in accordance with the principles of the present invention.
Figure 35:
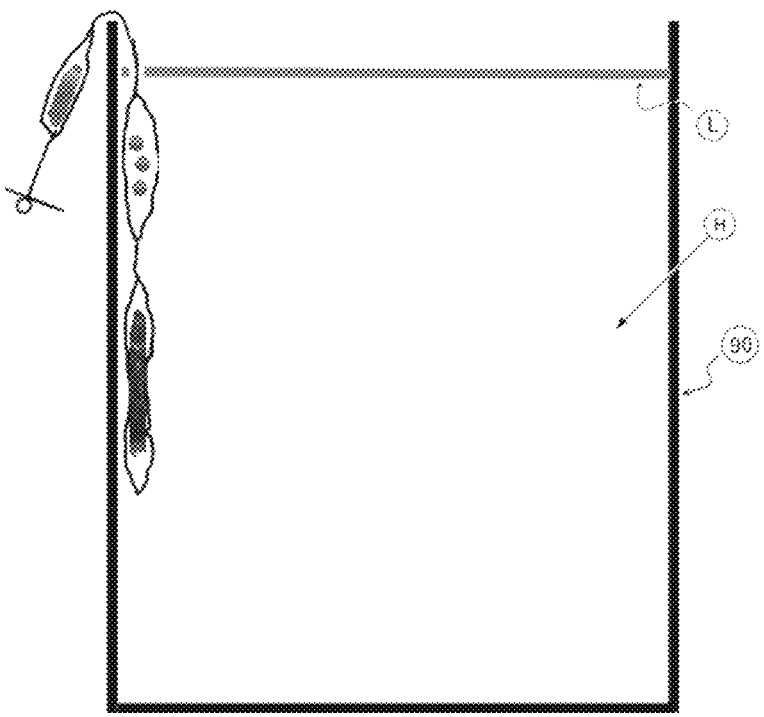
Figure 36:
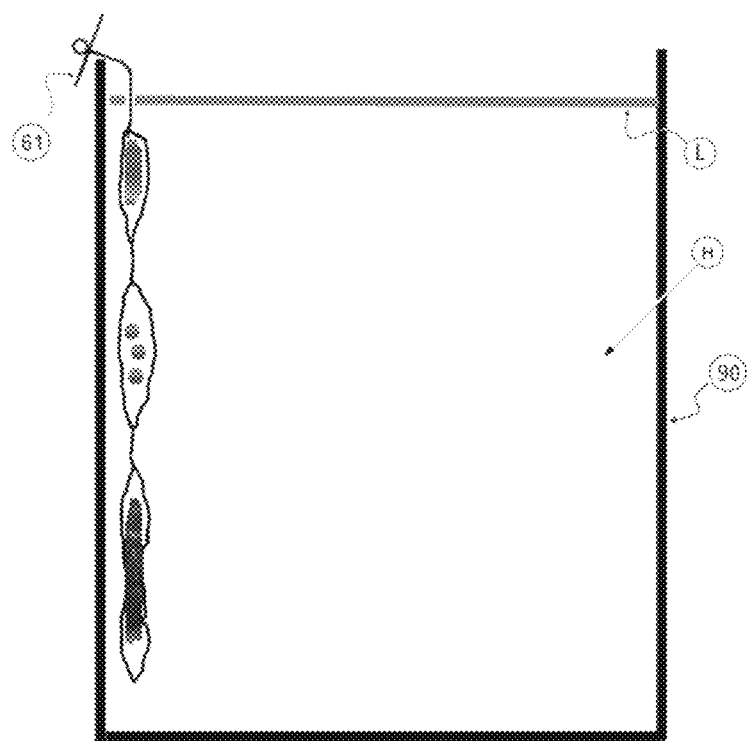

Now referring to FIGS. 34-36, according to another embodiment, the bag 1 may be lowered manually. The method to manually lower a bag 1 in hot liquid is generally achieved by hanging the bag 1 on a compartment's edge by placing one of the gaps 64 on the edge. A gap aperture 66 may also be used to hang it more firmly. The bag 1 can then be held at any level (L) in the hot liquid. The user must then manually lower the bag 1 by placing another gap 64 on the edge for each meal component to be cooked. The user may do it at a specified time and for a specific duration. In some instances, the use of the bag 1 may be improved by using a counterweight attached to the bag 1 (typically attached to the Rod Hanging System).

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. An automated immersion cooking method of a plurality of food components in at least one bag, the at least one bag comprising at least two discrete sections and being immersible in a water-based liquid, the discrete sections being impervious from one another, wherein the method comprises:

a controller retrieving predetermined cooking instructions associated to the at least one bag, the cooking instructions comprising cooking times for each discrete section;

holding the at least one bag in a compartment to vertically superpose the at least two discrete sections, the discrete section being associated with the highest cooking time being the lowermost section of the suspended bag and the discrete section associated with the lowest cooking time being the uppermost section of the suspended bag;

controlling automatic filling of a first volume of water-based liquid in the compartment comprising the at least one suspended bag to immerse a first non-immersed discrete section of the bag in the water-based liquid according to the cooking times of the predetermined cooking instructions, the filled volume of water-based liquid filing the compartment to a first predetermined level being associated with a height of the first discrete section being immersed, wherein the water-based liquid is maintained at a temperature to allow cooking of the food;

following a predetermined period of time after the filling of the first volume of water-based liquid, the predetermined period of time being defined by the predetermined cooking instructions, controlling automatic filling of a second volume of water-based liquid in the compartment filled with the first volume of water-based liquid to immerse a second non-immersed discrete section of the bag in the water-based liquid according to the cooking times of the predetermined cooking instructions, the second volume of water-based liquid filing the compartment to a second predetermined level being associated with a height of the second discrete section being immersed, wherein the water-based liquid is maintained at a temperature to allow cooking of the food;

leaving each of the at least two discrete sections of the bag immersed within the water-based liquid for a specific duration according to the predetermined cooking instructions; and the immersed discrete sections of the bag ceasing to be immersed in the water-based liquid when the cooking time of the predetermined cooking instructions associated with the said immersed sections is over.

2. The automated immersion cooking method as described in claim 1, wherein the method further comprises a step to maintain the temperature of the compartment at a temperature to preserve the food.

3. The automated immersion cooking method as described in claim 2, wherein the water-based liquid is maintained at a predetermined temperature to preserve food and the water-based liquid is circulated in the compartment to preserve the food components in the at least one bag.

4. The automated immersion cooking method as described in claim 1, wherein retrieving the predetermined cooking instructions further comprises inputting the cooking instruction parameters relating to each of the discrete sections of the bag to be cooked.

5. The automated immersion cooking method as described in claim 1, wherein the at least one bag for cooking food is made of a material adapted for immersion cooking.

6. The automated immersion cooking method as described in claim 1, the step to cease the immersion of the immersed discrete sections of the bag further comprising draining the water-based liquid from the compartment.

7. An apparatus for automatically cooking food by immersion comprising:
   at least one impervious compartment in liquid communication with the container, each compartment being shaped to receive at least one bag for cooking food, the bag comprising at least two discrete sections adapted to receive food, the sections being impervious from one another, wherein each compartment comprises:
   i. a mechanism to automatically fill a water-based liquid in the compartment to at least two different predetermined levels, each predetermined level allowing immersion of one or more sections of the bag; and
   ii. a mechanism to automatically drain the water-based liquid from the compartment;
   a controller unit, the controller unit controlling the mechanism to independently fill and drain the water-based liquid in each of the compartments;
   at least one bag holder, the bag holder being adapted to hold the bag to vertically superpose the at least two sections of the bag;
   a liquid circulation system;
   wherein the controller unit is further configured to:
   retrieve predetermined cooking instructions associated to the at least one bag, the predetermined cooking instructions comprising:
   i. data for determining a cooking duration relating to each of the discrete sections of the at least one bag of food; and
   ii. filling sequences of the compartment associated to the at least one bag;
   instruct the mechanism to fill and drain predetermined volumes of the water-based liquid in the compartment at predetermined times to cook each section for the cooking duration of the predetermined cooking instructions and according to the filling and draining sequences of the compartment associated to the at least one bag.

8. The apparatus as described in any of claim 7, wherein at least one of the at least one compartment comprises at least one liquid level sensor, the at least one liquid level sensor being configured to communicate detected liquid level data to the controller unit.

9. The apparatus as described in any of claim 7, wherein the apparatus further comprises a mechanism to maintain the temperature of at least one of the compartments at a temperature to preserve food.

10. The apparatus as described in any of claim 7, wherein the apparatus further comprises a user interface for inputting the cooking instructions relating to the at least one bag to be cooked.

11. The apparatus as described in claim 7, wherein the apparatus further comprises a connection to a network and wherein the controller unit fetches the cooking instructions relating to the at least one bag of food from a data source.

12. The apparatus as described in claim 7, wherein the controller unit is a server and executes cooking instructions on reception of a request from a client device.

13. The apparatus as described in claim 7, wherein at least one compartment comprises:
   at least one fluid inlet valve;
   at least one fluid outlet valve;
   wherein the controller unit is connected to the inlet and outlet valves and controls the opening of the inlet and outlet valves to let gas and/or hot liquid in and out of the at least one compartment.

14. The apparatus as described in claim 13, wherein at least one of the compartments comprises at least one temperature sensor and at least one liquid level sensor connected to the controller unit and wherein the controller unit uses the temperature sensor and the liquid level sensor output values as parameters to:
   fill at least one of the compartments at one of the predetermined liquid levels;
   drain liquid from each compartment as required by the cooking instructions at one of the predetermined liquid levels.

15. The apparatus as described in claim 14, wherein at least one of the compartments comprises at least one temperature sensor configured to communicate detected temperature data to the controller unit, the controller unit being further configured to use the detected temperature data as a parameter to calculate the volume of cold liquid to be filled in the compartment through the fluid inlet valve or the volume of the water-based liquid to be drained from the outlet valve.

16. The apparatus as described in claim 7, wherein the predetermined cooking instructions further comprise draining sequence of the compartment associated to the at least one bag.

17. The apparatus as described in claim 16, the draining sequence being the reverse of the filling sequence.

18. An automated immersion cooking method using at least one bag for cooking food, the bag comprising at least two individual discrete sections and being immersible in a water-based liquid, the sections being impervious from one another, wherein the method comprises:
   maintaining the bag to vertically superpose the at least two sections in an independent compartment, wherein the at least two sections contain food;
   a controller retrieving cooking instructions associated with the food contained in the at least two sections of the bag;
   inserting a plurality of food components in the at least two discrete sections of the at least one bag in a sequence according to the cooking instructions;
   for each of the at least one bag, controlling automatic filling of the compartment comprising the bag of the water-based liquid at a first predetermined level to immerse the at least two sections of the bag, wherein the water-based liquid is maintained at a temperature to allow cooking of the food;
   leaving the bag within the water-based liquid;
   controlling automatic draining of predetermined volumes of the water-based liquid of the compartment comprising the at least one bag such that each immersed section of the bag sequentially ceases to be immersed in the water-based liquid the sequence at predetermined times, the drained volumes corresponding to a volume of the water-based liquid allowing one of the immersed sections to be out of the water-based liquid;
   wherein the cooking instructions comprises the predetermined times of draining associated with the at least two sections of the bag.

19. An automated immersion cooking method of a plurality of food components in at least one bag, the at least one bag comprising at least two discrete sections and being immersible in a water-based liquid, the discrete sections being impervious from one another, wherein the method comprises:

a controller retrieving predetermined cooking instructions associated to the at least one bag, the cooking instructions comprising cooking times for each discrete section;

holding the at least one bag in a compartment to vertically superpose the at least two discrete sections, the discrete section being associated with the highest cooking time being the lowermost section of the suspended bag and the discrete section associated with the lowest cooking time being the uppermost section of the suspended bag;

filling the compartment comprising the at least one suspended bag with the water-based liquid to immerse the at least two discrete sections of the bag in the water-based liquid, wherein the water-based liquid is maintained at a temperature to allow cooking of the food;

leaving each of the at least two discrete sections of the bag immersed within the water-based liquid for a specific duration according to the predetermined cooking instructions;

controlling automatic draining of a first volume of the water-based liquid out of the compartment comprising the at least one suspended bag to cease immersion of a first immersed discrete section of the bag according to the cooking times of the predetermined cooking instructions, the draining of the first volume of water-based liquid lowering the water-based liquid to a first predetermined level being associated with a height of the first discrete section ceasing to be immersed and following a predetermined period of time after the draining of the first volume of water-based liquid, controlling automatic draining of a second volume of water-based liquid out of the compartment comprising the at least one suspended bag to cease immersion of a second immersed discrete section of the bag according to the cooking times of the predetermined cooking instructions, the draining of the second volume of water-based liquid lowering the water-based liquid to a second predetermined level being associated with a height of the second discrete section ceasing to be immersed;

maintaining the water-based liquid at a temperature to allow cooking of the food.

* * * * *